United States Patent
Iyer et al.

(10) Patent No.: US 10,192,065 B2
(45) Date of Patent: Jan. 29, 2019

(54) AUTOMATED INTELLIGENT PROVISIONING OF DATA STORAGE RESOURCES IN RESPONSE TO USER REQUESTS IN A DATA STORAGE MANAGEMENT SYSTEM

(71) Applicant: Commvault Systems, Inc., Tinton Falls, NJ (US)

(72) Inventors: Sudha Krishnan Iyer, Woodbridge, NJ (US); Duncan Alden Littlefield, Millstone Township, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 525 days.

(21) Appl. No.: 14/841,160

(22) Filed: Aug. 31, 2015

(65) Prior Publication Data

US 2017/0060918 A1    Mar. 2, 2017

(51) Int. Cl.
| | |
|---|---|
| G06F 17/30 | (2006.01) |
| G06F 21/62 | (2013.01) |
| G06F 3/06 | (2006.01) |

(52) U.S. Cl.
CPC ........ *G06F 21/6218* (2013.01); *G06F 3/0605* (2013.01); *G06F 3/0631* (2013.01);
(Continued)

(58) Field of Classification Search
CPC ....................... G06F 21/6218; G06F 17/30221
(Continued)

(56) References Cited

U.S. PATENT DOCUMENTS

| | | |
|---|---|---|
| 4,084,231 A | 4/1978 | Capozzi et al. |
| 4,267,568 A | 5/1981 | Dechant et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

Arneson, "Mass Storage Archiving in Network Environments" IEEE, Oct. 31-Nov. 1998, pp. 45-50.

(Continued)

*Primary Examiner* — Phong H Nguyen
(74) *Attorney, Agent, or Firm* — Commvault Systems, Inc.

(57) ABSTRACT

A data storage management system comprises enhanced capabilities for automatically discovering operational characteristics of data storage devices installed in the system. A user interface enables end-users to submit requests for storage resources ranging from a simple request for a certain amount of storage space to more complex requests that specify the type of storage technology, the manufacturer, the I/O speed of the storage device, etc. The end-user also may include an expiration timeframe for the requested storage space. The system identifies storage devices that are suitable to the end-user's request, automatically provisions the storage space (e.g., LUN), and assigns it to the requestor. The assigned storage space may automatically expire, based on user-requested or system-provided expiration timeframes. Expired storage space is returned to a logical pool of available resources so that it may be assigned in response to other requests. The system comprises special-purpose policies that govern which data storage devices may be used for (Continued)

users submitting requests and further specify other administrative constraints.

16 Claims, 11 Drawing Sheets

(52) U.S. Cl.
CPC .......... *G06F 3/0665* (2013.01); *G06F 3/0685* (2013.01); *G06F 17/30221* (2013.01)

(58) Field of Classification Search
USPC .............................................. 707/781, 783
See application file for complete search history.

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,076,327 B1 | 7/2006 | Desai et al. | |
| 7,130,970 B2 | 10/2006 | Devassy et al. | |
| 7,162,496 B2 | 1/2007 | Amarendran et al. | |
| 7,174,433 B2* | 2/2007 | Kottomtharayil ..... | G06F 3/0617 711/147 |
| 7,246,207 B2 | 7/2007 | Kottomtharayil et al. | |
| 7,315,923 B2 | 1/2008 | Retnamma et al. | |
| 7,320,131 B1* | 1/2008 | O'Toole, Jr. ............ | G06F 9/505 705/52 |
| 7,343,453 B2 | 3/2008 | Prahlad et al. | |
| 7,389,311 B1 | 6/2008 | Crescenti et al. | |
| 7,395,282 B1 | 7/2008 | Crescenti et al. | |
| 7,440,982 B2 | 10/2008 | Lu et al. | |
| 7,454,569 B2 | 11/2008 | Kavuri et al. | |
| 7,487,288 B2* | 2/2009 | Kishi ..................... | G06F 3/0607 711/111 |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,747,579 B2 | 6/2010 | Prahlad et al. | |
| 7,801,864 B2 | 9/2010 | Prahlad et al. | |
| 7,809,914 B2 | 10/2010 | Kottomtharayil et al. | |
| 8,046,560 B1* | 10/2011 | Voorhees .......... | G06F 17/30194 711/165 |
| 8,166,257 B1* | 4/2012 | Holl, II ................. | G06F 13/28 711/114 |
| 8,170,995 B2 | 5/2012 | Prahlad et al. | |
| 8,229,954 B2 | 7/2012 | Kottomtharayil et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,578,120 B2 | 11/2013 | Attarde et al. | |
| 9,065,853 B2* | 6/2015 | Dorbes ................. | H04L 67/16 |
| 9,189,167 B2 | 11/2015 | Vijayan et al. | |
| 2004/0044772 A1 | 3/2004 | Harkin | |
| 2005/0256999 A1* | 11/2005 | Kishi .................... | G06F 3/0607 711/111 |
| 2006/0224846 A1 | 10/2006 | Amarendran et al. | |
| 2006/0235892 A1* | 10/2006 | Kalach ................ | G06F 11/3409 714/E11.206 |
| 2008/0028009 A1* | 1/2008 | Ngo .................... | G06F 11/2097 707/E17.01 |
| 2008/0294698 A1* | 11/2008 | Fujimoto .............. | G06F 3/0613 707/E17.01 |
| 2009/0064286 A1* | 3/2009 | Murphy ................. | G06F 21/34 726/4 |
| 2009/0288084 A1* | 11/2009 | Astete ................. | G06F 9/45533 718/1 |
| 2009/0319534 A1 | 12/2009 | Gokhale | |
| 2010/0254241 A1 | 10/2010 | Aoki | |
| 2010/0312944 A1 | 12/2010 | Walker | |
| 2011/0179240 A1 | 7/2011 | Sukonik et al. | |
| 2012/0150818 A1 | 6/2012 | Vijayan Retnamma et al. | |
| 2012/0150826 A1 | 6/2012 | Vijayan Retnamma et al. | |
| 2013/0198468 A1* | 8/2013 | Antony ............... | G06F 11/3442 711/162 |
| 2015/0301748 A1* | 10/2015 | Lee ....................... | G06F 3/0688 711/103 |
| 2016/0162198 A1 | 6/2016 | Vijayan et al. | |
| 2016/0192178 A1* | 6/2016 | Blong .................... | G06F 3/067 455/418 |
| 2017/0228257 A1* | 8/2017 | Dong ................... | G06F 9/5027 |
| 2018/0067654 A1 | 3/2018 | Vijayan et al. | |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

(56) References Cited

OTHER PUBLICATIONS

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

\* cited by examiner

AUTOMATED INTELLIGENT PROVISIONING OF DATA STORAGE RESOURCES IN RESPONSE TO USER REQUESTS IN A DATA STORAGE MANAGEMENT SYSTEM

INCORPORATION BY REFERENCE TO ANY PRIORITY APPLICATIONS

Any and all applications, if any, for which a foreign or domestic priority claim is identified in the Application Data Sheet of the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that not only protect and manage, but also leverage their data. For instance, data analysis capabilities, information management, improved data presentation and access features, and the like, are in increasing demand.

SUMMARY

Provisioning of data storage resources can be time-consuming and technically challenging, because of diverse storage technologies, interconnect protocols, manufacturers, operational parameters, configuration options, management interfaces, and administrator expertise. For many end-users, data storage provisioning is a one-time event that typically occurs when someone joins an organization or obtains a computing device requiring access to external storage. Typically, this one-time event is handled by a system administrator who sets up the data storage configuration and communicates any pertinent information to the end-user.

However, some end-users require relatively frequent and/or changeable provisioning of additional data storage resources, but they lack the privileges necessary to do the provisioning. For example, a finance department might need additional data storage for a number of auditors conducting an audit; a tester might need a variety of different data storage resources for test purposes and may have specific needs for certain storage technologies, manufacturers, and other operational characteristics that are pertinent to the testing task; etc. Such scenarios can require substantial skill and research to identify appropriate storage resources and determine their availability, and ultimately can become burdensome on system administrators.

The present inventors devised a more streamlined approach that intelligently and automatically provisions data storage resources in response to end-user requests. An illustrative data storage management system comprises enhanced capabilities for automatically discovering operational characteristics of data storage devices installed in the system—operational characteristics that are relevant to analyzing and responding to storage requests submitted by end-users. The system provides a user interface that enables end-users to request storage resources ranging from a simple request for a certain amount of storage space to more complex requests that specify details such as the type of storage technology, the manufacturer, the I/O speed of the storage device, etc. The system identifies storage devices that are suitable to the end-user's request and automatically provisions the storage space (e.g., LUN) and assigns it to the requestor. The end-user may activate a "map" operation that enables the storage space to be accessed by one or more client computing devices; the end-user may ultimately end the assignment for example by activating "unmap" operation(s).

The assigned storage space may automatically expire, based on end-user-requested or system-provided expiration timeframes. Expired storage space is returned to a logical pool of available resources so that it may be assigned in response to other requests. The system comprises special-purpose information management policies that govern which data storage devices may be assigned to which end-users and/or computing devices and under what conditions, e.g., organizing the relationships by geography, department, technology, cost profile, etc.

The illustrative data storage management system comprises an enhanced storage manager that manages the system as a whole as well as initiates auto-discovery of installed storage devices and processes end-user requests for storage space. The enhanced storage manager also imports storage information from pre-existing in-use data storage devices so that they may also be covered by appropriate information management policies according to the illustrative embodiment. When an end-user request is being processed, an enhanced media agent component receives provisioning instructions from the enhanced storage manager and implements the instructions by communicating with individual data storage devices to set up the appropriate configurations and/or to tear them down. The illustrative system, accompanying methods, and associated computer-readable media are described in further detail herein.

DETAILED DESCRIPTION

Detailed descriptions and examples of systems and methods according to one or more illustrative embodiments of the present invention may be found in the section entitled AUTOMATED INTELLIGENT PROVISIONING OF DATA STORAGE RESOURCES IN RESPONSE TO USER REQUESTS, as well as in the section entitled Example Embodiments, and also in FIGS. 2-5 herein. Furthermore, components and functionality for automated intelligent provisioning of data storage resources may be configured and/or incorporated into information management systems such as those described herein in FIGS. 1A-1H.

Various embodiments described herein are intimately tied to, enabled by, and would not exist except for, computer technology. For example, automated discovery of operational characteristics of installed data storage devices as well as processing of end-user requests for data storage resources described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
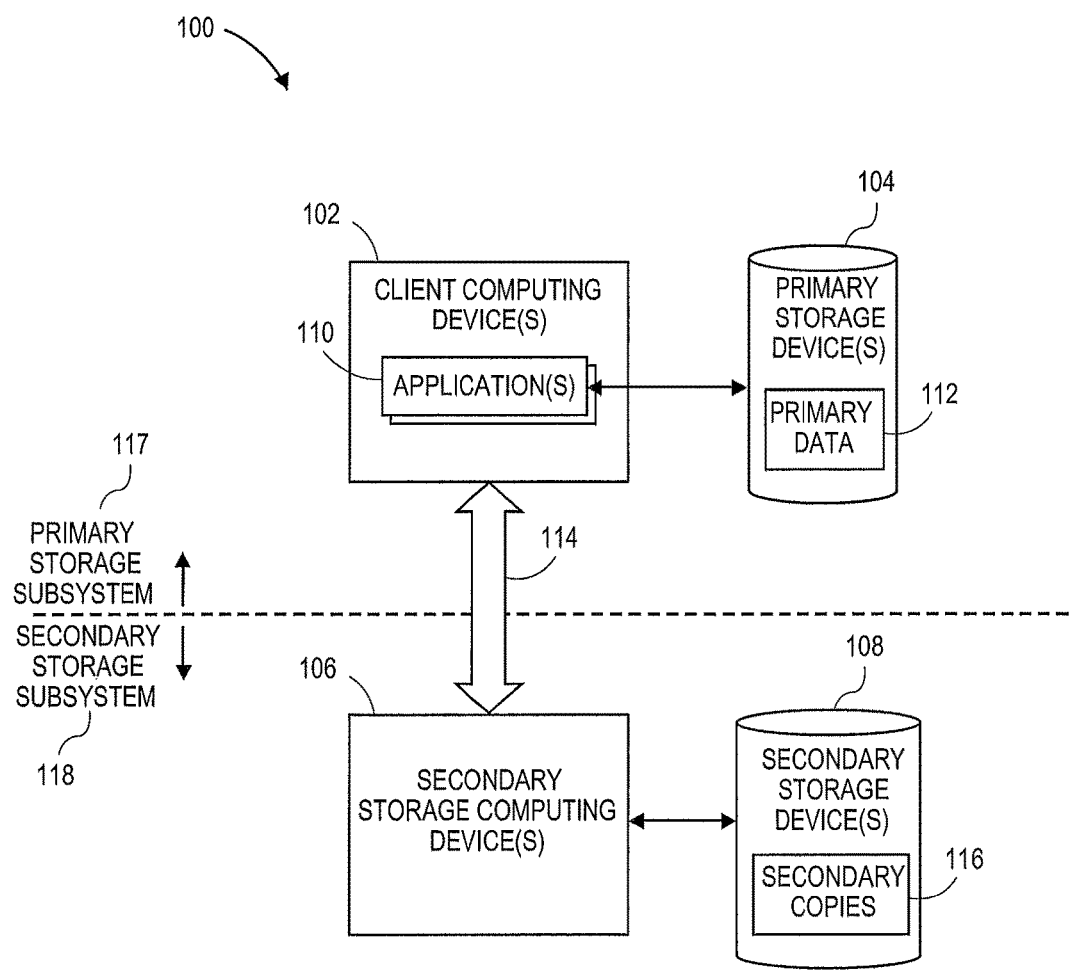
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" and the operations it performs may be referred to as "information management operations" or "storage operations" in some circumstances. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. Pub. No. 2006/0224846, entitled "System and Method to Support Single Instance Storage Operations";

U.S. Pat. Pub. No. 2009/0319534, entitled "Application-Aware and Remote Single Instance Data Management";

U.S. Pat. Pub. No. 2012/0150818, entitled "Client-Side Repository in a Networked Deduplicated Storage System"; and U.S. Pat. Pub. No. 2012/0150826, entitled "Distributed Deduplicated Storage System".

Information management system 100 can include a variety of computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, and web servers. Computing devices may comprise one or more processors (e.g., CPU and/or single-core or multi-core processors), as well as non-transitory computer-readable memory (e.g., random-access memory (RAM)) for storing computer programs to be executed by the one or more processors. Other computer-readable memory for mass storage of data may be packaged/configured with the computing device (e.g., an internal hard disk) and/or may be external and accessible by the computing device (e.g., network-attached storage).

In some cases, a computing device includes cloud computing resources, which may be virtual machines. For instance, one or more virtual machines may be provided to the organization by a third-party cloud service vendor. In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. Examples of hypervisors as virtualization software include ESX Server, by VMware, Inc. of Palo Alto, Calif.; Microsoft Virtual Server and Microsoft Windows Server Hyper-V, both by Microsoft Corporation of Redmond, Wash.; and Sun xVM by Oracle America Inc. of Santa Clara, Calif. In some embodiments, the hypervisor may be firmware or hardware or a combination of software and/or firmware and/or hardware. The hypervisor provides resources to each virtual operating system such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the e way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include a variety of electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries or other magnetic, non-tape storage devices, optical media storage devices, DNA/RNA-based memory technology, combinations of the same, etc. In some embodiments, storage devices can form part of a distributed file system. In some cases, storage devices are provided in a cloud storage environment (e.g., a private cloud or one operated by a third-party vendor), whether for primary data or secondary copies or both.

Figure 1B:
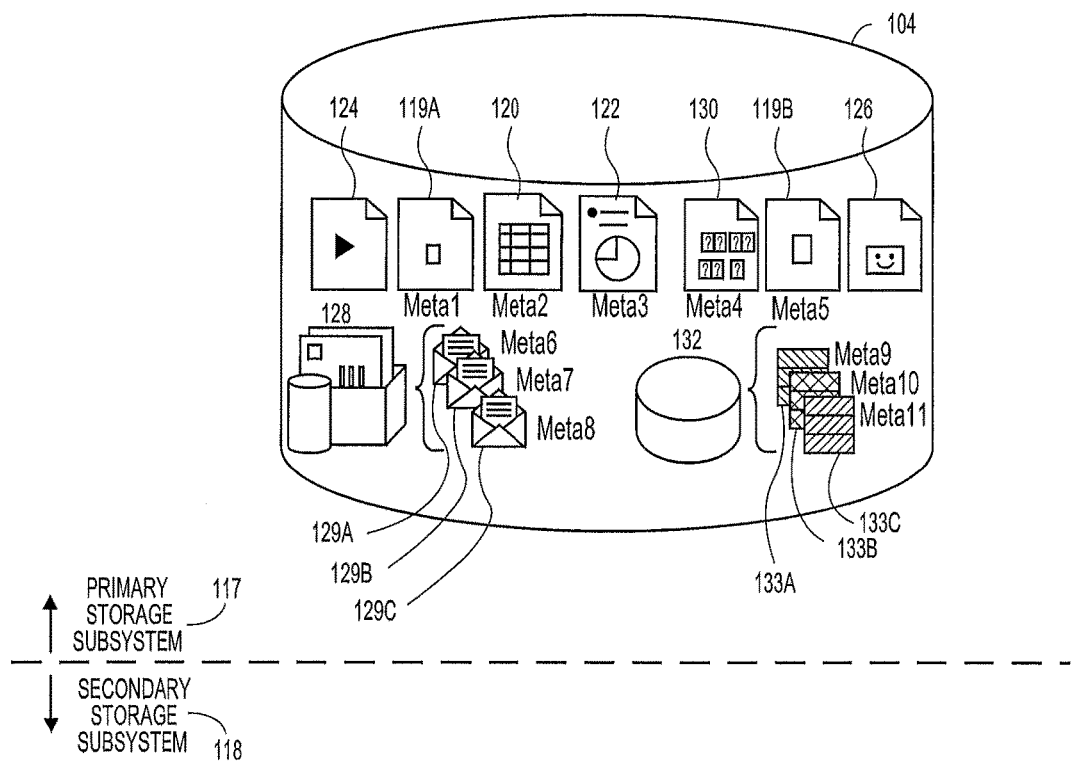
FIG. 1B is a detailed view of a primary storage device, a secondary storage device, and some examples of primary data and secondary copy data.
Figure 1B:
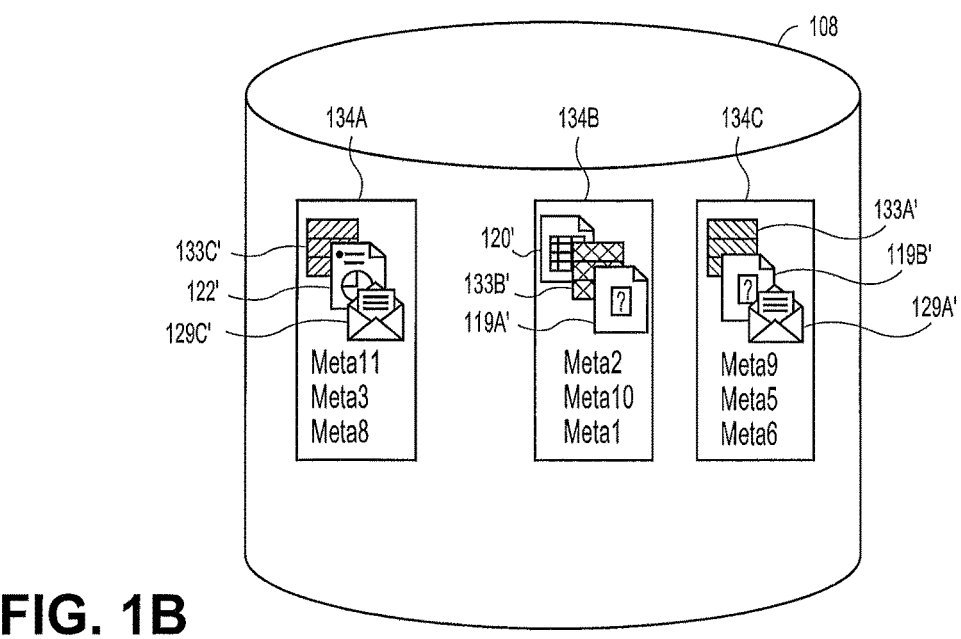
Figure 1C:
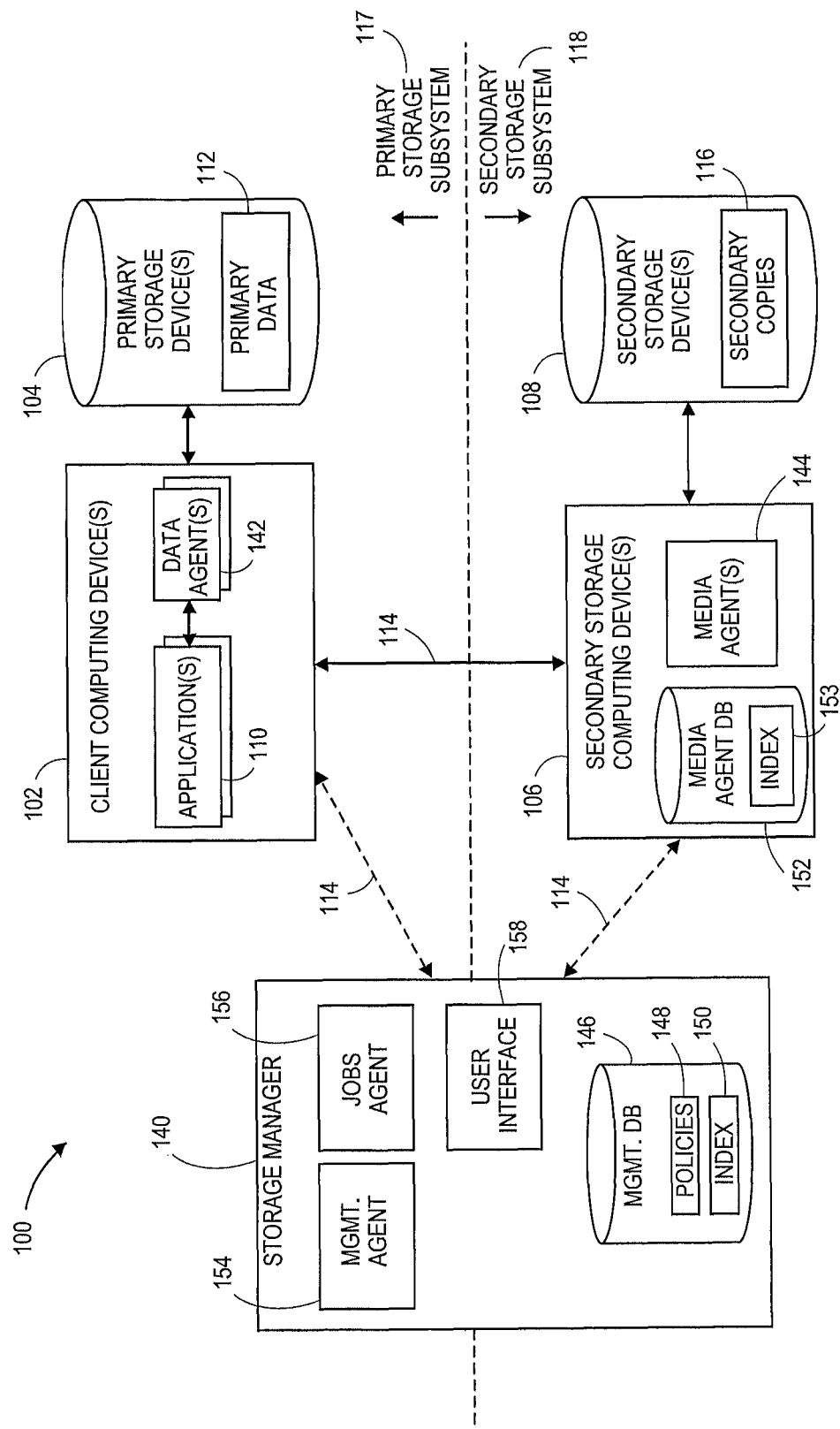
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" may sometimes refer to one or more of the following components, which will be described in further detail below: storage manager, data agent, and media agent.

Information management system 100 includes one or more client computing devices 102 having an operating system and at least one application 110 executing thereon; and one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, and web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file server applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142. A file system, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110, and may belong to one given client, portions of the data may be assigned to different subclients for distinct treatment by the information management system. More detail on subclients is given in regard to storage policies below.

Primary Data and Exemplary Primary Storage Devices

Primary data 112 is generally production data or other "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. According to certain aspects, primary data 112 is an initial or first stored body of data generated by the source application 110. Primary data 112 in some cases is created substantially directly from data generated by the corresponding source application 110.

Primary storage devices 104 storing primary data 112 may be relatively fast and/or expensive technology (e.g., a disk drive, a hard-disk storage array, solid state memory, etc.), typically because they must support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Primary data 112 may include structured data (e.g., database files), unstructured data (e.g., documents), and/or semi-structured data. See, e.g., FIG. 1B.

It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and (ii) a subset of such a file (e.g., a data block, an extent, etc.).

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Each client computing device 102 is generally associated with and/or in communication with one or more primary storage devices 104 storing corresponding primary data 112. A client computing device 102 may be considered to be associated with or in communication with a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data in the particular primary storage device 104. A client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

Information management system 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Creation of secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention, before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), so that users can browse and restore at a later time. After creation of a secondary copy 116 representative of certain primary data 112, a pointer or other location indicia (e.g., a stub) may be placed in primary data 112, or be otherwise associated with primary data 112, to indicate the current location on secondary storage device(s) 108 of a particular secondary copy 116.

Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists.

For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112. First, secondary copies 116 can be stored in a different format (e.g., backup, archive, or other non-native format) than primary data 112. For this or other reasons, secondary copies 116 may not be directly useable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging. For instance, hundreds or thousands of client computing devices 102 may be continually generating large volumes of primary data 112 to be protected. Also, there can be significant overhead involved in the creation of secondary copies 116. Moreover, secondary storage devices 108 may be special-purpose components, and devices that write to, read from, or otherwise interact with secondary storage devices 108, such as secondary storage computing devices 106 and corresponding media agents 144, may require specialized programmed intelligence and/or hardware capability. Client computing devices 102 may interact directly with a secondary storage device 108 to create secondary copies 116; however, in view of the factors described above, this approach can negatively impact the ability of client computing device 102 to serve/service application 110 and produce primary data 112. Further, any given client computing device 102 may not be optimized for interaction with certain secondary storage devices 108.

Thus, information management system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components can provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E).

Secondary storage computing device(s) 106 can comprise any of the computing devices described above, without limitation. In some cases, secondary storage computing device(s) 106 also include specialized hardware and/or software componentry for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof) to the designated secondary storage computing device 106, via a communication pathway 114. Secondary storage computing device 106 in turn may perform further processing and may convey the data (or a processed version thereof) to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view showing some specific examples of primary data stored on primary storage device(s) 104 and secondary copy data stored on secondary storage device(s) 108, with other components of the system removed for the purposes of illustration. Stored on the primary storage device(s) 104 are primary data 112 objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C). Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134b represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

Information management system 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact performance as well as the adaptability of system 100 to data growth and other changing circumstances.

FIG. 1C shows an information management system 100 designed according to these considerations and which includes: storage manager 140, one or more data agents 142 executing on client computing device(s) 102 and configured to process primary data 112, and one or more media agents 144 executing on the one or more secondary storage computing devices 106 for performing tasks involving the secondary storage devices 108.

Storage Manager

Storage manager 140 is a centralized storage and/or information manager that is configured to perform certain control functions and also to store certain critical information about system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application, which, in some embodiments operates in conjunction with one or more associated data structures such as a dedicated database (e.g., management database 146). In some embodiments, storage manager 140 is itself a computing device that performs the functions described herein. The storage manager generally initiates, performs, coordinates and/or controls storage and other information management operations performed by the system 100, e.g., to protect and control primary data 112 and secondary copies 116. In general, storage manager 100 may be said to manage information management system 100, which includes managing constituent components such as data agents and media agents, etc.

As shown by the dashed arrowed lines 114 in FIG. 1C, storage manager 140 may communicate with and/or control some or all elements of the information management system 100, such as data agents 142 and media agents 144. In this manner, storage manager 140 may control the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

communicating with data agents 142 and media agents 144, including transmitting instructions, messages, and/or queries, as well as receiving status reports, index information, messages, and/or queries, and responding to same;

initiating execution of information management operations;

initiating restore and recovery operations;

managing secondary storage devices 108 and inventory/capacity of the same;

allocating secondary storage devices 108 for secondary copy operations;

reporting, searching, and/or classification of data in system 100;

monitoring completion of and status reporting related to information management operations and jobs;

tracking movement of data within system 100;

tracking age information relating to secondary copies 116, secondary storage devices 108, comparing the age information against retention guidelines, and initiating data pruning when appropriate;

tracking logical associations between components in system 100;

protecting metadata associated with system 100, e.g., in management database 146;

implementing job management, schedule management, event management, alert management, reporting, job history maintenance, user security management, disaster recovery management, and/or user interfacing for system administrators and/or end users of system 100;

sending, searching, and/or viewing of log files; and implementing operations management functionality.

Storage manager 140 may maintain an associated database 146 (or "storage manager database 146" or "management database 146") of management-related data and information management policies 148. Database 146 can be stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; or other useful data. For example, storage manager 140 may use index 150 to track logical associations between media agents 144 and secondary storage devices 108 and/or movement of data from primary storage devices 104 to secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the secondary storage). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies), status and reporting information about completed jobs (e.g., status on yesterday's backup jobs), and additional information sufficient to enable restore and disaster recovery operations (e.g., media agent associations, location indexing, content indexing, etc.)

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job may be a logical grouping of information management operations such as generating backup copies of a primary data 112 subclient at a certain time every day. Thus, jobs agent 156 may access information management policies 148 (e.g., in management database 146) to determine when and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to system 100 and/or its constituent components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data useable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within information management system 100 and/or with other information management cells via network protocols and, application programming interfaces (APIs) including, e.g., HTTP, HTTPS, FTP, REST, virtualization software APIs, cloud service provider APIs, and hosted service provider APIs.

Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communication and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 in creating or restoring secondary copies 116. Data agent 142 may be a software program (e.g., a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s). For instance, data agent 142 may take part in copying, archiving, migrating, and/or replicating of primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt primary data 112 before transmitting it to media agent 144. Data agent 142 also may receive instructions from storage manager 140 to restore (or assist in restoring) a secondary copy 116 from secondary storage device 108 to primary storage 104, such that the restored data may be accessed by application 110.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: a Microsoft Exchange Mailbox data agent 142 to back up the Exchange mailboxes; a Microsoft Exchange Database data agent 142 to back up the Exchange databases; a Microsoft Exchange Public Folder data agent 142 to back up the Exchange Public Folders; and a Microsoft Windows File System data agent 142 to back up the file system of client computing device 102. In such embodiments, these specialized data agents 142 may be treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata.

In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster information management operations, and enhanced scalability. In one example which will be discussed further below, media agent 144 can act as a local cache of recently-copied data and/or metadata that it stored to secondary storage device(s) 108, thus improving restore capabilities and performance.

Media agent 144 is a component of information system 100 and is generally directed by storage manager 140 in creating or restoring secondary copies 116. Whereas storage manager 140 generally manages information management system 100, media agent 144 provides a portal to secondary storage devices 108. Media agent 144 may be a software program (e.g., a set of executable binary files) that executes on a secondary storage computing device 106. Media agent 144 generally manages, coordinates, and facilitates the transmission of data between a client computing device 102 (executing a data agent 142) and secondary storage device(s) 108. For instance, other components in the system may interact with media agent 144 to gain access to data stored on secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116.

Media agents 144 can comprise separate nodes of system 100 (e.g., nodes that are separate from client computing devices 102, storage manager 140, and/or secondary storage devices 108). In general, a node can be a logically and/or physically separate component, and in some cases is a component that is individually addressable or otherwise identifiable. In addition, each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fiber Channel link.

Each media agent 144 may maintain an associated media agent database 152. Media agent database 152 may be stored to a disk or other storage device (not shown) that is local to the secondary storage computing device 106 on which media agent 144 operates. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108.

Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
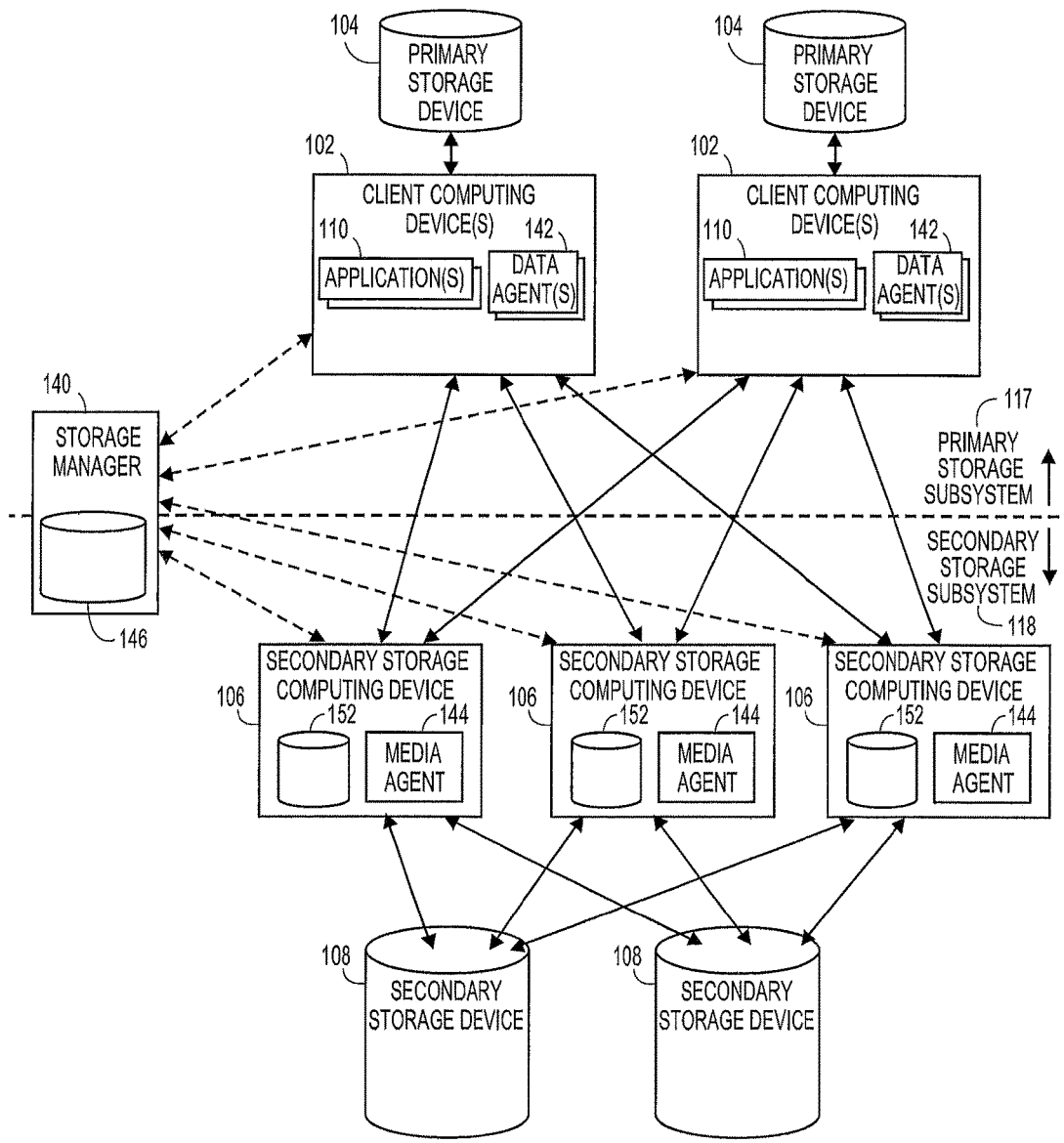
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations

In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a native format of the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage.

Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. Archive copies are generally retained for longer periods of time than backup copies. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from processing involved in creating and managing snapshots.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product may be Microsoft Volume Snapshot Service (VSS), which is part of the Microsoft Windows operating system.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary, storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, information management system 100 may calculate and/or store signatures (e.g., hashes or cryptographically unique IDs) corresponding to the individual data portions in the source data and compare the signatures instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, but nonetheless significantly reduce stored-data redundancy. Depending on the embodiment, deduplication portions such as data blocks can be of fixed or variable length. Using variable length blocks can enhance deduplication by responding to changes in the data stream, but can involve complex processing. In some cases, system 100 utilizes a technique for dynamically aligning deduplication blocks based on changing content in the data stream, as described in U.S. Pat. No. 8,364,652.

Information management system 100 can perform deduplication in a variety of manners at a variety of locations. For instance, in some embodiments, system 100 implements "target-side" deduplication by deduplicating data at the media agent 144 after being received from data agent 142. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826. Instead of or in combination with "target-side" deduplication, deduplication can also be performed on the "source-side" (or "client-side"), e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. Pub. No. 2012/0150818. Some other deduplication/single instancing techniques are described in U.S. Pat. Pub. Nos. 2006/0224846 and 2009/0319534.

Information Lifecycle Management and Hierarchical Storage Management

In some embodiments, files and other data over, their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that is larger than a given size threshold or older than a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

According to one example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

Information management system 100 may also make and retain disaster recovery copies, often as secondary, high-availability disk copies. System 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116.

Encryption Operations

Information management system 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to", "from," "cc," "bcc," attachment name, received time, etc.). Content indexes may be searched and search results may be restored.

Information management system 100 generally organizes and catalogues the results into a content index, which may be stored within media agent database 152, for example. The content index can also include the storage locations of or pointer references to indexed data in primary data 112 or secondary copies 116, as appropriate. The results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, there may be one or more metabases associated with individual components, e.g., client computing devices 102 and/or media agents 144. In some embodiments, a data classification database may reside as one or more data structures within management database 146, or may be otherwise associated with storage manager 140 or may reside as a separate component.

In some cases, metabase(s) may be included in separate database(s) and/or on separate storage device(s) from primary data 112 and/or secondary copies 116, such that operations related to the metabase(s) do not significantly impact performance on other components of information management system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which the information management system can search through and identify data as compared to other approaches which can involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of information management system 100 to provide useful system-wide management and reporting functions. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or other component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to show a "virtual view" of the system that graphically depicts the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality, of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

Information management system 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining group of tape drives and a group of tapes, respectively, for use in storing the subclient data. While information in the storage policy can be statically assigned in some cases, some or all of the information in the storage policy can also be dynamically determined based on criteria, which can be set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of operations associated with the storage policy, such as a backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device

102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is an "audit policy" (or security policy), which comprises preferences, rules and/or criteria that protect sensitive data in information management system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

- schedules or other timing information, e.g., specifying when and/or how often to perform information management operations;
- the type of secondary copy 116 and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Copy Operations

Figure 1E:
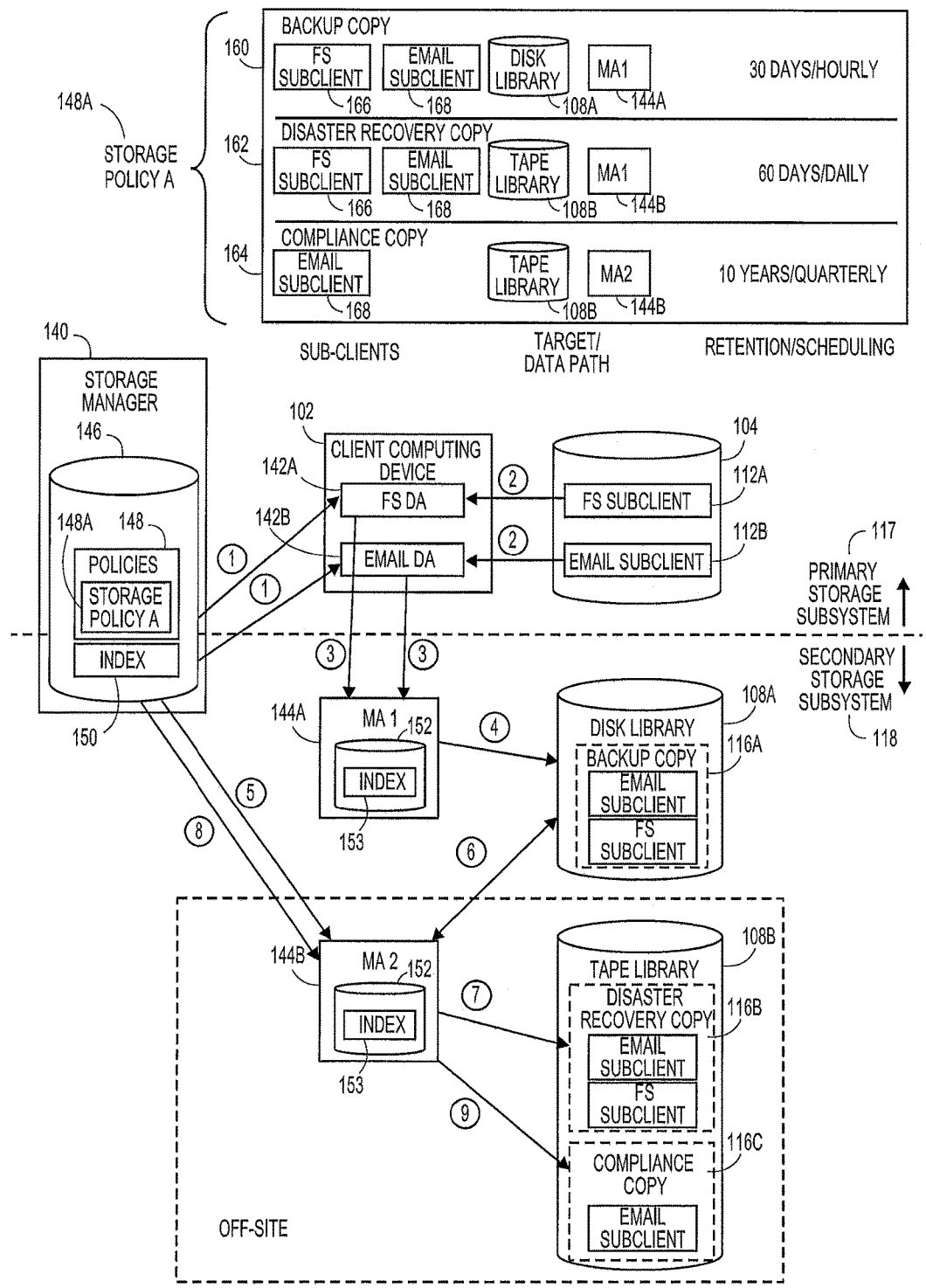
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences (or rule set) 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that copies generated under compliance copy rule set 164 will be retained for 10 years and will be generated quarterly.

Secondary Copy Jobs

A logical grouping of secondary copy operations governed by a rule set and being initiated at a point in time may be referred to as a "secondary copy job" and sometimes may be called a "backup job," even though it is not necessarily limited to creating backup copies. Secondary copy jobs may be initiated on demand as well. Steps 1-9 below illustrate three secondary copy jobs based on storage policy 148A.

At step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B operating on client computing device 102 respond to the instructions received from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 (e.g., using file system data agent 142A) communicates the processed data to the first media agent 144A according to backup copy rule set 160, as directed by storage manager 140. Storage manager 140 may further keep a record in management database 146 of the association between media agent 144A and one or more of: client computing device 102, file system data agent 142A, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job according to the disaster recovery rule set 162. Illustratively this includes steps 5-7 occurring daily for creating disaster recovery copy 116B. Disaster recovery copy 166B will be based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be generated in some other manner, such as by using primary data 112A, 112B from primary storage device 104 as source data. The disaster recovery copy operation is initiated once a day and disaster recovery copies 116B are deleted after 60 days; indexes 153 and/or 150 are updated accordingly when/after each information management operation is executed and/or completed. The present backup job may be considered to be complete.

At step 8, storage manager 140 initiates another backup job according to compliance rule set 164, which includes steps 8-9 occurring quarterly for creating compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases when backup copy 116A was recently created or accessed, caching may speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpackage (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage. In some cases the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. The headers can include a variety of information such as file identifier(s), volume(s), offset(s), or other information associated with the payload data items, a chunk sequence number, etc. Importantly, in addition to being stored with secondary copy 116 on secondary storage device 108, the chunk headers can also be stored to index 153 of the associated media agent(s) 144 and/or to index 150 associated with storage manager 140. This can be useful in some cases for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams", and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
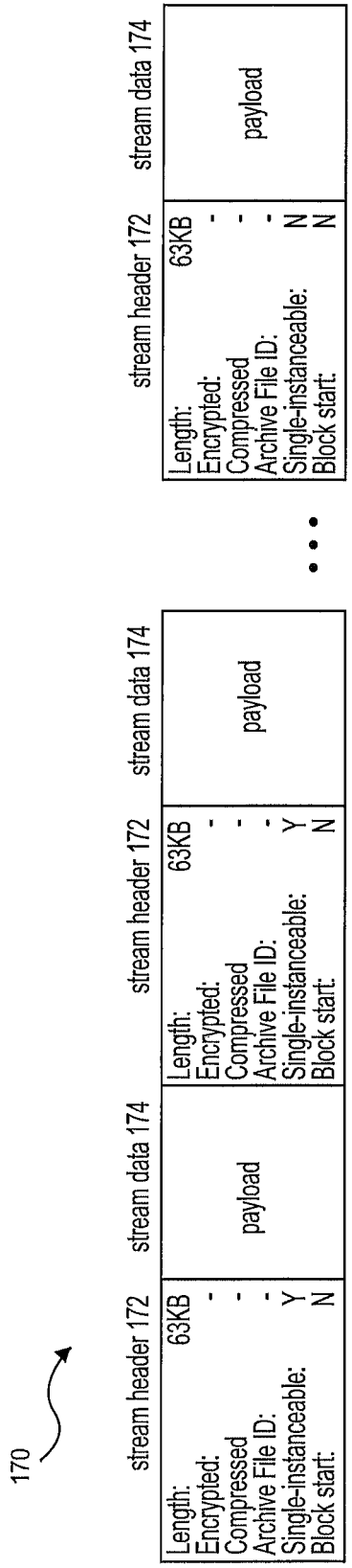
FIGS. 1F-1H are block diagrams illustrating suitable data structures that may be employed by the information management system.
Figure 1G:
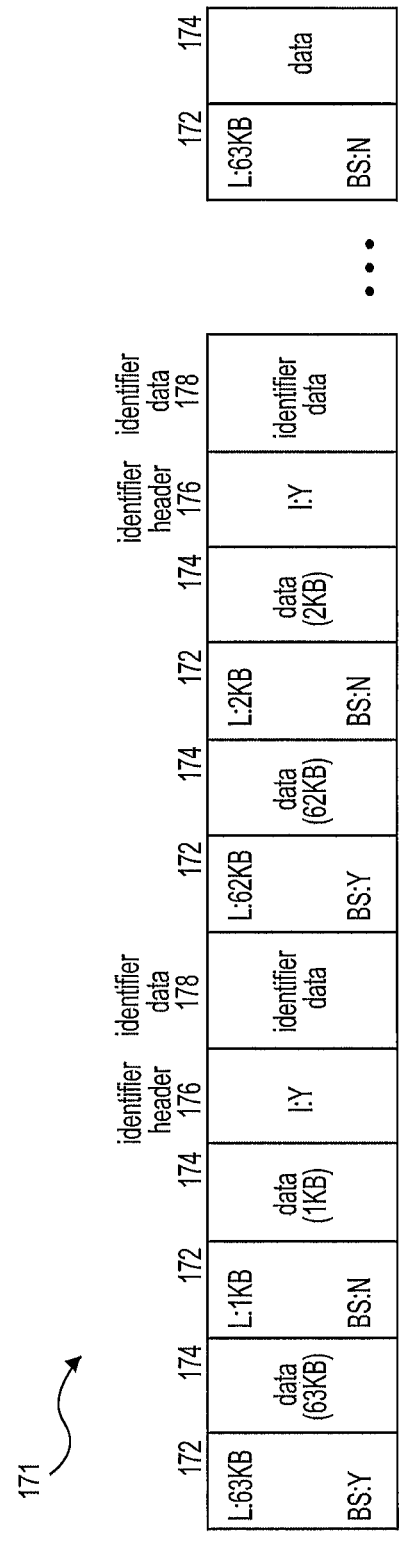

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
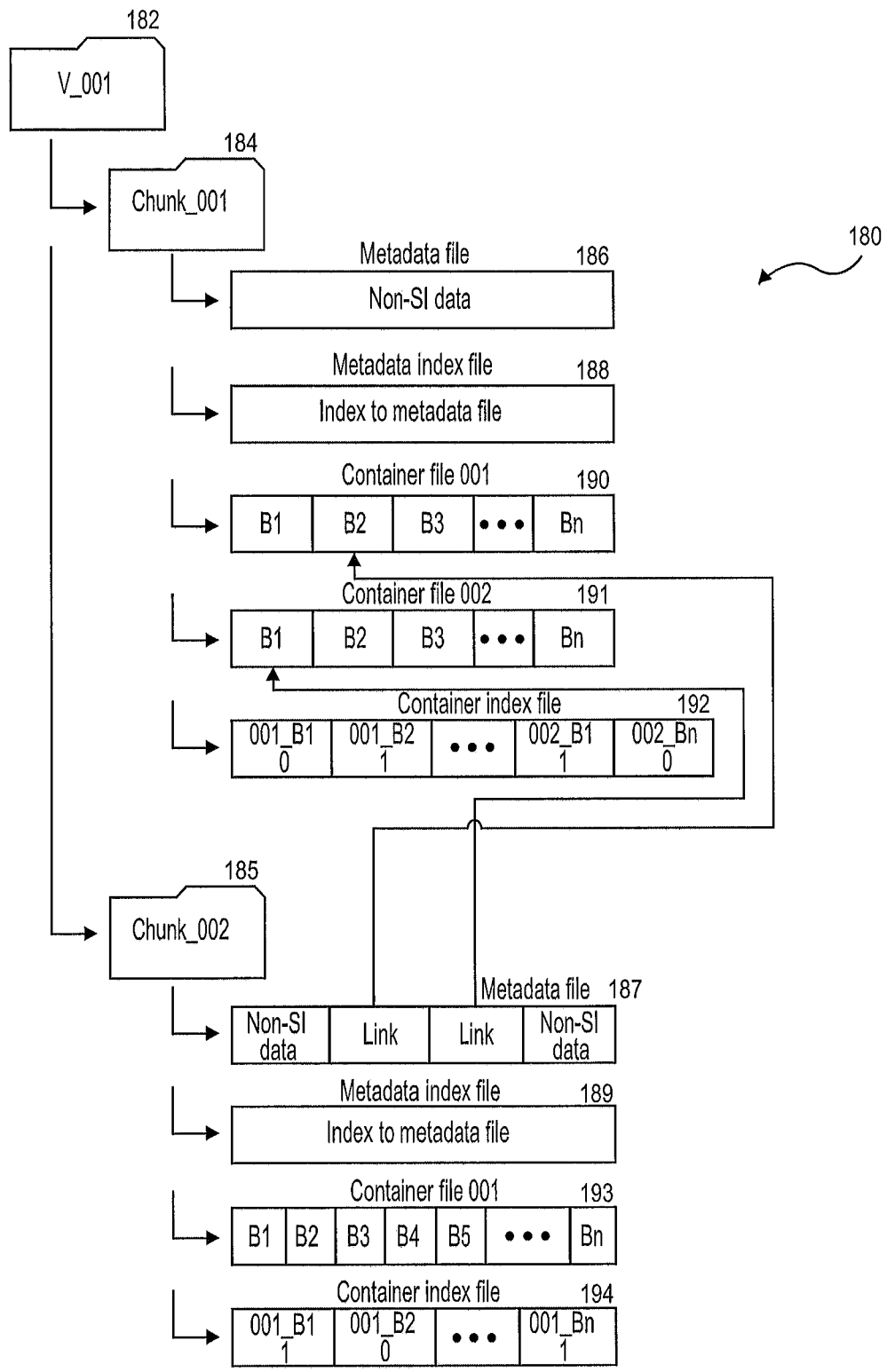

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device.

Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approximately 100 to approximately 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Figure 2:
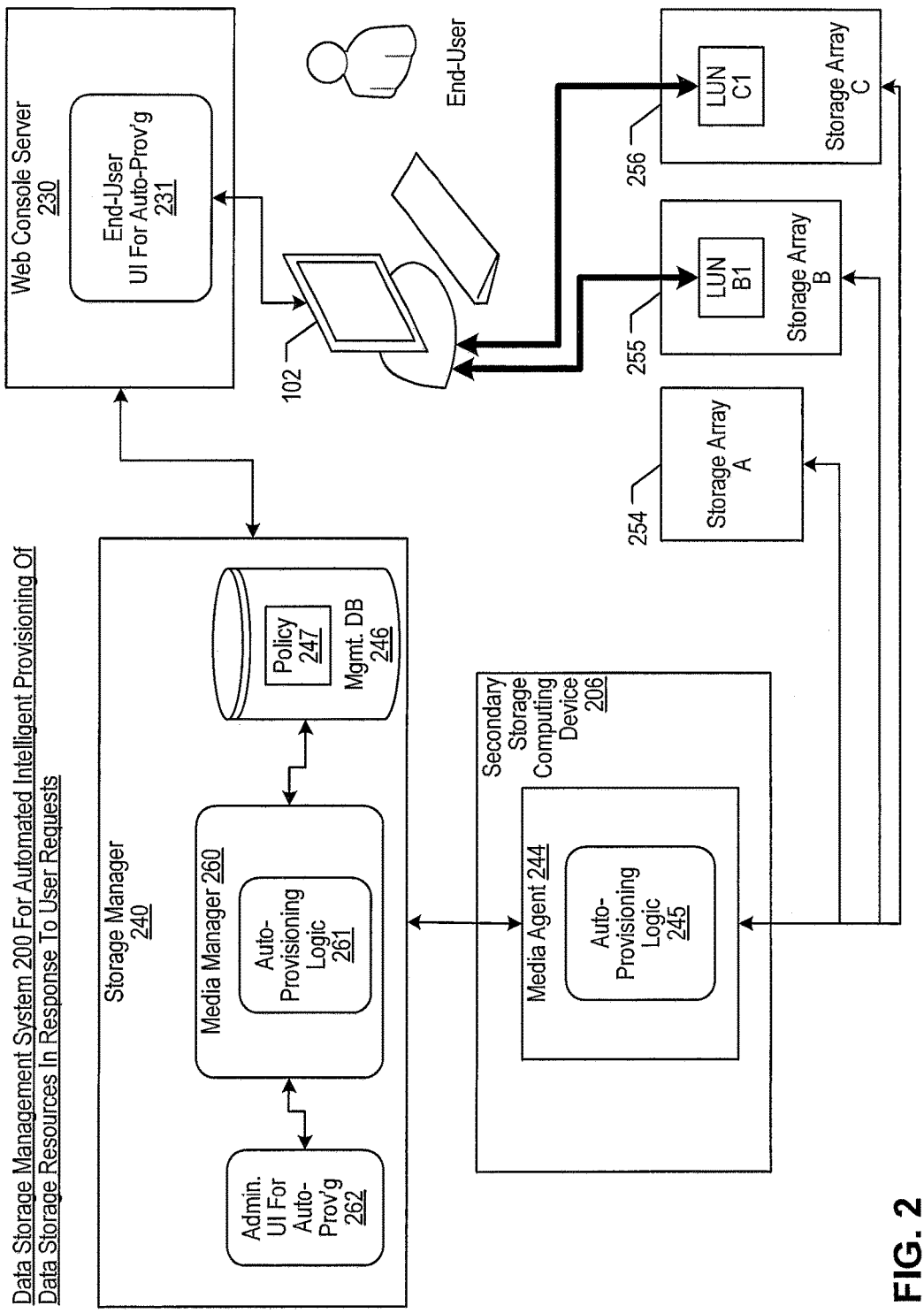
FIG. 2 is a block diagram illustrating some salient portions of a data storage management system 200 for automated intelligent provisioning of data storage resources in response to end-user requests, according to an illustrative embodiment of the present invention.

Automated Intelligent Provisioning of Data Storage Resources in Response to User Requests FIG. 2 is a block diagram illustrating some salient portions of a data storage management system 200 for intelligent provisioning of data storage resources in response to end-user requests, according to an illustrative embodiment of the present invention. Data storage management system 200 ("system 200") may be an embodiment of an information management system comprising enhanced functionality as disclosed herein. System 200 comprises: client computing device 102; secondary storage computing device 206, comprising media agent 244; web console server 230, comprising end-user user interface 231; storage manager 240, comprising management database 246, media manager 260, and administrator user interface 262; and data storage devices 254, 255, and 256. The components are logically interconnected as shown by the arrows. The physical communications infrastructure required to support these logical connections is well known in the art and may be any suitable electronic communications infrastructure, such as described in regard to communication pathways 114 above.

Client computing device 102, which is described in further detail elsewhere herein, is depicted here with an end-user. The term "end-user" is utilized in respect to the illustrative embodiment to distinguish from a user who may have administrative privileges to system 200 and may be generally referred to as an "administrator." Accordingly, the depicted end-user may access and use such utilities of system 200 that are available to end-users, e.g., an end-user interface 231 for handling storage requests. However, the depicted end-user lacks administrative privileges and therefore lacks access to elements of system 200 that are reserved to administrators, such as administering clients, data agents, media agents, storage devices, and information management policies. In fact, the end-user and associated client computing device(s) 102 may be subject to information management policies that govern how the end-user's data will be protected and managed in system 200. In general, end-users lack control over the governing information management policies, which are established and maintained by administrators. In the illustrative scenario presented here, the depicted end-user will submit requests to system 200 for data storage resources that are managed and controlled by system 200.

Secondary storage computing device 206 is analogous to secondary storage computing device 106 and additionally comprises enhanced functionality for operating in system 200, e.g., media agent 244 comprising auto-provisioning processing logic 245. Secondary storage computing device 206 hosts Media agent 244.

Web console server 230 is a computing device that may be configured to provide web access to certain aspects of system 200. For example, web console server 230 may serve an end-user interface for automated provisioning 231, which is directed at end-users such as the one depicted here, and which the end-user may access via client computing device 102. As shown here, server 230 communicates with storage manager 240; furthermore end-user interface 231 presents data obtained from and submits inputs to storage manager 240. In some embodiments, end-user interface 231 may be hosted by and served from storage manager 240.

Storage manager 240 manages system 200. Storage manager 240 is analogous to storage manager 140 and further comprises additional functionality for operating in system 200, e.g., administrator user interface 262, media manager 260 comprising auto-provisioning logic 261, information management policy(ies) 247, and may also serve and/or service end-user interface 231. In reference to the illustrative embodiment of the present invention, storage manager 240 may generally perform one or more of the following operations, in any combination, without limitation:

administration of storage devices such as storage arrays 254-256 (e.g., using admin user interface 262) and storing administered metadata to management database 246;

automatically discovering operational characteristics of installed/administered data storage devices, e.g., type of storage technology, data storage interconnect protocol, make and model of storage device, storage capacity, provisionable data storage entity (e.g., logical unit number ("LUN")) count capacity, input/output speed of the storage device, etc.;

importing storage information about pre-existing in-use data storage devices which may already provide storage resources for client computing device components in the system;

maintaining a logical pool of available storage devices, e.g., 254-256, and their respective discovered operational characteristics, including keeping track of currently assigned and unassigned storage space;

administration of information management policies 247 (e.g., using admin user interface 262) that govern automated provisioning of data storage resources in response to end-user requests;

storing information management policies 247 to management database 246;

receiving and processing requests submitted by end-users requesting data storage space, including instructing media agent(s) to provision requested storage space, assigning the provisioned storage space to the requesting end-user and granting access thereto;

tracking usage of the storage devices in the pool and using measures of usage to decide which data storage device may best respond to an end-user request;

tracking expiration timeframes for data storage resources assigned in response to end-user requests, e.g., default system timeframe, timeframe specified by the governing information management policy 247, timeframe provided in the end-user's request, etc.;

withdrawing access to provisioned storage space after the applicable expiration timeframe expires, which may be accompanied by one or more of: notices and/or warnings to the end-user; enabling the end-user to extend the expiration timeframe; and/or otherwise working around the timeframe before withdrawing access; and releasing expired storage space back to the pool of available data storage devices and updating the tracking thereof, e.g., in management database 246.

Media agent 244 is analogous to media agent 144 and additionally comprises functionality for operating in system 200, e.g., auto-provisioning logic 245. In reference to the illustrative embodiment of the present invention, media agent 244 may generally perform one or more of the following operations in regard to one or more data storage devices that are administratively associated with the respective media agent, in any combination, without limitation:

receiving instructions from storage manager 240 to discover operational characteristics of one or more associated data storage devices (e.g., 254-256) targeted by the storage manager;

communicating with the target data storage devices to implement the received instructions and extract operational characteristics;

reporting the discovered operational characteristics to storage manager 240;

receiving instructions from storage manager 240 to provision a given amount of storage space in a target data storage device, e.g., LUN B1 in storage array B 255 in the amount of 1 GB of storage space;

communicating with the target data storage device to implement the received instructions and get the storage space provisioned, e.g., instructing a storage array to reserve a LUN, etc.;

reporting and/or confirming to storage manager 240 whether the storage space has been successfully provisioned at the target data storage device;

receiving instructions from storage manager 240 to release a certain provisioned storage space, e.g., LUN B1;

communicating with the target data storage device to implement the received instructions and get the storage space appropriately released and marked as available at the data storage device;

reporting and/or confirming to storage manager 240 whether the storage space has been successfully released at the target data storage device.

In short, media agent 244 plays a key role in the automatic intelligent provisioning of data storage resources according to the illustrative embodiment, but generally performs operations as instructed by storage manager 240. In some alternative embodiments, media agent 244 may have additional responsibilities, such as tracking locally which storage space(s) in a target data storage device have been assigned and which ones are available for assignment; this information may be maintained in an enhanced version of media agent index cache 153 as an example implementation.

Management database 246 is analogous to management database 146 and is part of or otherwise associated with storage manager 240. Management database 246 stores key information about system 200 that is used by storage manager 240 to manage system 200. In particular reference to the illustrative embodiment, management database. 246 may comprise one or more of the following without limitation: information management policies 247; operational characteristics of data storage devices which were automatically discovered by and/or under the direction of storage manager 240; the pool of available data storage devices, as well as measures of usage and tracking information about assigned and unassigned data storage space; etc.

Media manager 260 is a functional module of storage manager 240, which is generally concerned with operations involving access to storage devices in system 200, and may be implemented as executable software and/or firmware, which executes on the underlying computing device that hosts storage manager 240. Illustratively, media manager 260 comprises special-purpose logic 261 for handling some of the auto-provisioning operations according to the illustrative embodiment. Auto-provisioning logic 261 may be generally responsible for all or part of the operations enumerated above in regard to the enhanced functionality of storage manager 240 in system 200, e.g., automatically discovering operational characteristics of installed/administered data storage devices; maintaining the pool of available storage devices and tracking unused/unassigned storage space; receiving and processing end-user requests, including instructing media agent(s), assigning provisioned storage space and granting access thereto; etc., without limitation.

Media manager 260 and auto-provisioning logic 261 are shown herein as distinct components to ease understanding of the present disclosure, however, alternative embodiments are also possible within the scope of the present invention. For example, these functional components may be layered on existing storage manager code, may be linked to storage manager code, may be logical constructs whose functionality is distributed through one or more other functional modules of the storage manager, such as management agent 154, and in any combination thereof. Likewise in respect to administrator user interface 262 and end-user interface 231, which may be implemented as enhancements to existing interfaces that are directed at administrators and end-users, respectively.

Administrator user interface 262 provides a system administrator with a user interface for performing one or more of the following operations without limitation: administering data storage devices (e.g., 254-256) as storage components of system 200; administering information management policies 247; terminating a storage space assignment.

Data storage devices 254, 255, and 256 are, illustratively, storage arrays. Data storage device 254 is identified as storage array A. Data storage device 255 is identified as storage array B and comprises a logical unit number ("LUN") designated B1, which is assigned to and accessed by client computing device 102 according to the illustrative embodiment. Data storage device 256 is identified as storage array C and comprises a LUN designated C1, which is assigned to and accessed by client computing device 102 according to the illustrative embodiment. Data storage devices 254, 255, and 256 may be storage arrays of different types and/or using different underlying media (e.g., optical, hard disk, flash, etc.) and/or having different total storage capacity and/or different LUN count capacities. Data storage devices 254, 255, and 256 may be of different manufacture, e.g., NetApp, Dell EqualLogic, IBM XIV, etc. without limitation. Data storage devices 254, 255, and 256 may possess other distinguishing operational characteristics, such as different I/O speeds, storage interconnect protocols (e.g., iSCSI, FC), storage space capacity, number of provisionable data storage entities such as LUNs, geography/location identifier, etc., without limitation, all of which may be automatically discovered as directed by storage manager 240 according to the illustrative embodiment.

In some alternative embodiments, a storage device such as 254, 255, and/or 255 may be a cloud-based storage resource, which, like storage arrays, has discoverable operational characteristics that may be relevant and useful for automated intelligent provisioning as disclosed herein. In some embodiments, a storage device such as 254, 255, and/or 255 may be a Common Internet File System ("CIFS") storage device or a Network File System ("NFS") storage device. Any combination and permutation of storage arrays, cloud-based storage, CIFS, NFS, and other storage devices may be provisioned as disclosed herein.

System 200 may further comprise any number of the depicted components as well as other components described elsewhere herein, e.g., other client computing devices 102, tape libraries 108, media agents 144, etc. Notably, a given end-user may be associated with or use any number of client computing devices 102, and system 200 may accommodate such end-users by allowing assigned storage space to be mapped (e.g., using a "map" command or equivalent) to more than one client computing device 102 as needed. For example, a cluster of client computing devices 102 may all map to and access a given auto-provisioned storage space, e.g., LUN B1. For example, an end-user may activate a "map" command (or equivalent) at a first client computing device 102 that maps an assigned storage space, e.g., LUN C1, to the first client computing device 102, may then activate an "unmap" command (or equivalent) that unmaps LUN C1, followed by another "map" to a different client computing device 102. According to the illustrative embodiment, mapping and unmapping (or equivalent operations) will not destroy the data stored in the assigned storage space, e.g., LUN C1, until a termination or release event occurs, such as when the end-user affirmatively releases the assigned storage space or when an expiration timeframe passes. The methods in subsequent figures describe these operations and system behaviors in more detail.

Figure 3:
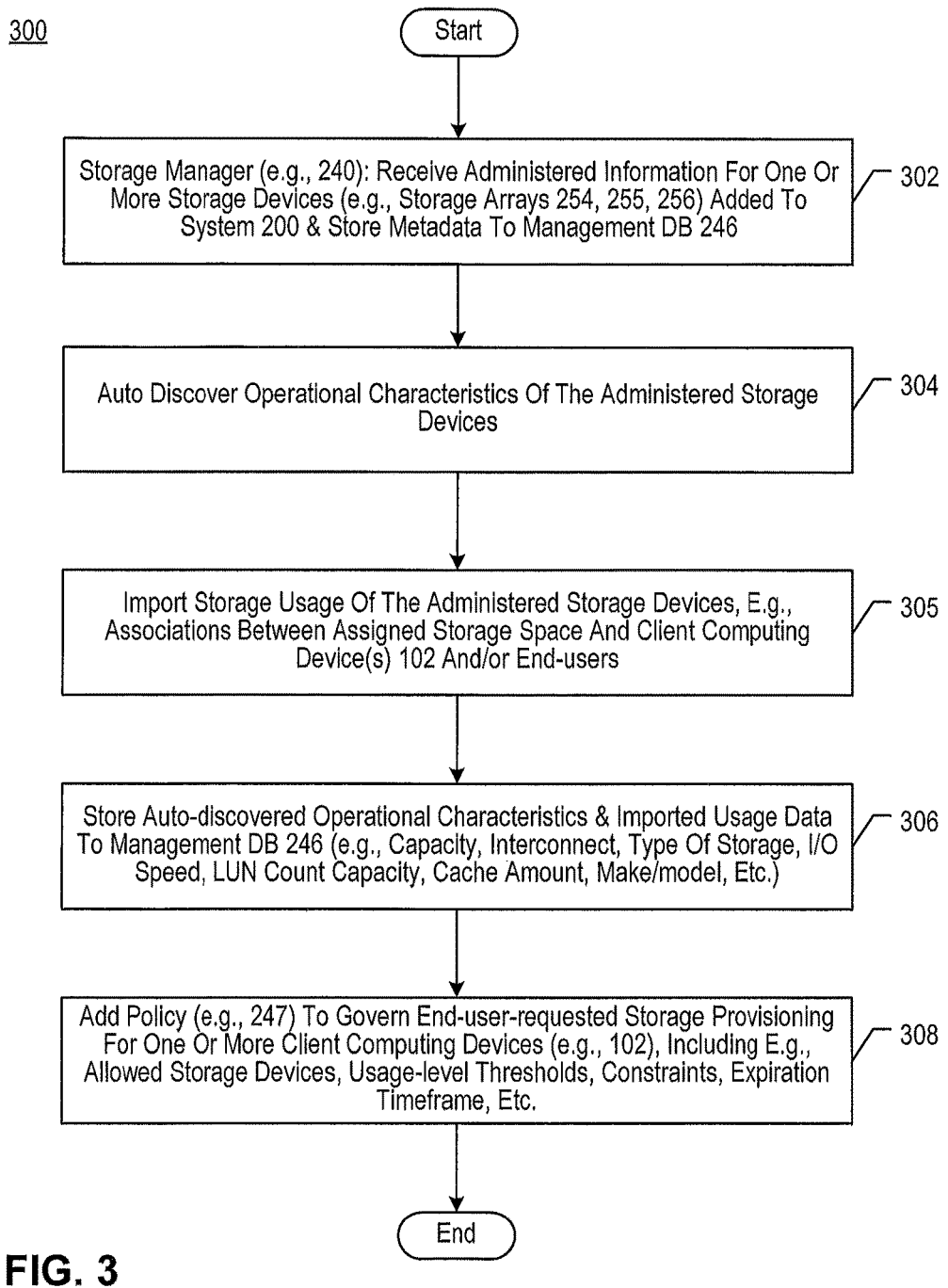
FIG. 3 depicts some salient operations of a method 300 operating in system 200 according to an illustrative embodiment of the present invention.

FIG. 3 depicts some salient operations of a method 300 operating in system 200 according to an illustrative embodiment of the present invention. Method 300 is generally directed at administration and auto-discovery operations performed by system 200.

At block 302, a storage manager (e.g., 240) may receive administered information for one or more storage devices (e.g., storage devices 254, 255, 256) added to system 200; this information may be entered by a system administrator (e.g., via administrator user interface 262) and may take the form of metadata, such as a designation for the storage device, an IP address, an association between the storage device and a media agent (e.g., 244), etc. Storage manager 240 may store the metadata to management database 246. For example, the association between a data storage device and a media agent 244 will be used in subsequent operations for accessing the respective data storage device in auto-discovery and auto-provisioning operations. The administrative information entered by the system administrator may include an indication of whether a given data storage device may be used in system 200 for automatic intelligent provisioning based on end-user requests as disclosed herein. In some systems, administrators may wish to restrict the pool of storage devices that may be auto-provisioned for end-users.

At block 304, system 200 may automatically discover (e.g., using auto-provisioning logic 261) operational characteristics of the administered storage devices according to the illustrative embodiment. For example, after a given data storage device has been administered and is recognized by storage manager 240 as a component of system 200, storage manager 240 may initiate one or more discovery operations via the media agent associated with the respective data storage device. For example, storage manager 240 may instruct media agent 244 to communicate with a target data storage device (e.g., 254) and obtain operational characteristics therefrom, e.g., total storage capacity of the storage device, type of storage technology (e.g., block-based, cloud, CIFS, NFS, etc.), storage interconnect protocol (e.g., FC, iSCSI, etc.), number of provisionable entities available (e.g., LUNs), input/output ("I/O") speed, etc.), amount of cache, manufacturer, model, geography/location designation, IP address, etc. in any combination without limitation. In response to the instructions received from storage manager 240, media agent 244 (e.g., using auto-provisioning logic 245) may communicate with the target data storage device to obtain the information and will then report results to storage manager 240. According to the illustrative embodiment, the discovery operations occur automatically without further intervention from system administrator(s). This is advantageous, not only because it saves extra effort on the part of the system administrator, but also because the system administrator need not know or have the skillset required to figure out which operational characteristics are relevant for automatic intelligent provisioning; instead, storage manager 240 orchestrates the media agent(s) 244 to collect and report back relevant operational characteristics of the various data storage devices.

At block 305, storage manager 240 may import (e.g., using auto-provisioning logic 261) information about the usage profiles of the administered storage devices. This might occur when the data storage devices are already in use in the system (e.g., prior to a system upgrade). In such a scenario, storage space in a given data storage device such as 254 may be assigned to and in use by any number of client computing devices 102 in system 200. At the present block, storage manager 240 automatically discovers such usage information (e.g., a usage profile for the data storage device), for example by consulting management database 246 and/or media agent(s) that are associated with the respective data storage device and which can provide details about how the storage space in the data storage device is allocated, assigned, accessed, and used, and by which particular computing devices. For example, storage manager 240 may discover which provisionable storage space entities (e.g., LUNs) are already assigned in the data storage device and may further discover associations between assigned storage space and client computing device(s) 102 and/or end-users that access data in the respective storage spaces. This information is said to be imported into the illustrative system. Accordingly, storage manager 240 may harmonize the imported information with the auto-discovered operational characteristics collected in the preceding block (e.g., using auto-provisioning logic 261), thus resulting in consistent data and data structures that carry information about the data storage devices in the system, whether in reference to pre-existing in use data storage device or newly installed ones; the harmonized information may be stored accordingly to management database 246.

Furthermore, storage manager 240 may go beyond importing and storing the imported information and may integrate it with information management policies 247, as described in further detail in regard to block 308.

At block 306, storage manager 240 may store (e.g., using auto-provisioning logic 261) imported usage information and auto-discovered operational characteristics (e.g., received from media agents 244) to management database 246. This information will be used later for responding to end-user requests for storage resources.

At block 308, storage manager 240 may add an information management policy (e.g., 247) to govern end-user-requested storage provisioning for one or more client computing devices 102. Policies 247 may be used to control how storage access may be provided and to whom, thus shaping the contours of how auto-provisioning operates in system 200 in response to end-user requests. Policies 247 may be administered by a system administrator (e.g., via administrator user interface 262). The system administrator may provide certain permissions and constraints—in the form of one or more policies 247—relative to the data storage devices that could be used in system 200 for end-user-requested storage.

A policy 247 will generally associate a pool of data storage devices with a number of users and/or computing devices. For example, a system administrator may allow certain end-users and/or client computing devices 102 to submit storage requests, e.g., testers and members of a certain corporate department, certain machines in a development lab, etc. For example, a system administrator may restrict access by geography, e.g., associating allowed end-users with data storage devices at the same location or on the same floor or in the same lab. For example, a policy 247 may include an expiration timeframe that will determine when the assigned storage space will be withdrawn from the requesting end-user and/or client computing device, e.g., 90 days. For example, a policy 247 may also include usage-level thresholds that will have the effect of directing the choice of data storage device based on a measure of usage of the data storage device candidates in the pool. For instance, a usage-level threshold of 50% may be specified in policy 247 such that a given data storage device will not be chosen in response to an end-user request when more than 50% of its capacity is already assigned; instead, another data storage device specified in policy 247, which is less used, will be chosen to allow for a more balanced distribution of data storage assignments. The presence of one or more usage thresholds in a policy 247 means that storage manager 240 is further responsible for tracking usage and assigned storage capacity in the respective data storage devices (e.g., using auto-provisioning logic 261); alternatively usage may be tracked by the associated media agent 244 (e.g., using auto-provisioning logic 245) and reported to storage manager 240.

As noted earlier, storage manager 240 may go beyond merely importing and storing the imported information regarding pre-existing in-use data storage devices and may integrate the imported information with information management policies 247. For example, an imported association between an assigned storage space (e.g., hosted by storage array C) and a client computing device 102 and/or end-user may be imported into an information management policy 247, such that the hosting data storage device becomes subject to and is governed by policy 247 on a going-forward basis. Illustratively, when storage manager 240 analyzes a data storage device for usage in the course of trying to satisfy an end-user request, the pre-existing in-use storage space will be part of the analysis, because it is governed by policy 247. As a result, illustratively, a heavily used data storage device that was imported into the illustrative system will tend to receive fewer or no new storage space assignments in response to end-user requests as compared to other data storage devices that are more lightly used and can still satisfy a given request. For example, if policy 247 has an expiration timeframe, the pre-existing in-use storage space will be subjected to the expiration timeframe along with the other storage spaces assigned under the policy 247. For example, warnings of impeding expiration may be sent to respective end-users. The effect of the importation functionality, as described in regard to blocks 305 and 308 and elsewhere herein, advantageously provides a broader umbrella of control over data storage devices in system 200, whether they were previously in use or newly added to the system.

After block 308, method 300 may end or control may pass back to block 302 for support of any number of additional data storage devices. There is no limit to the number of policies 247, number of data storage devices, number of associated end-users, and/or number of computing devices that may be operating in system 200.

Figure 4:
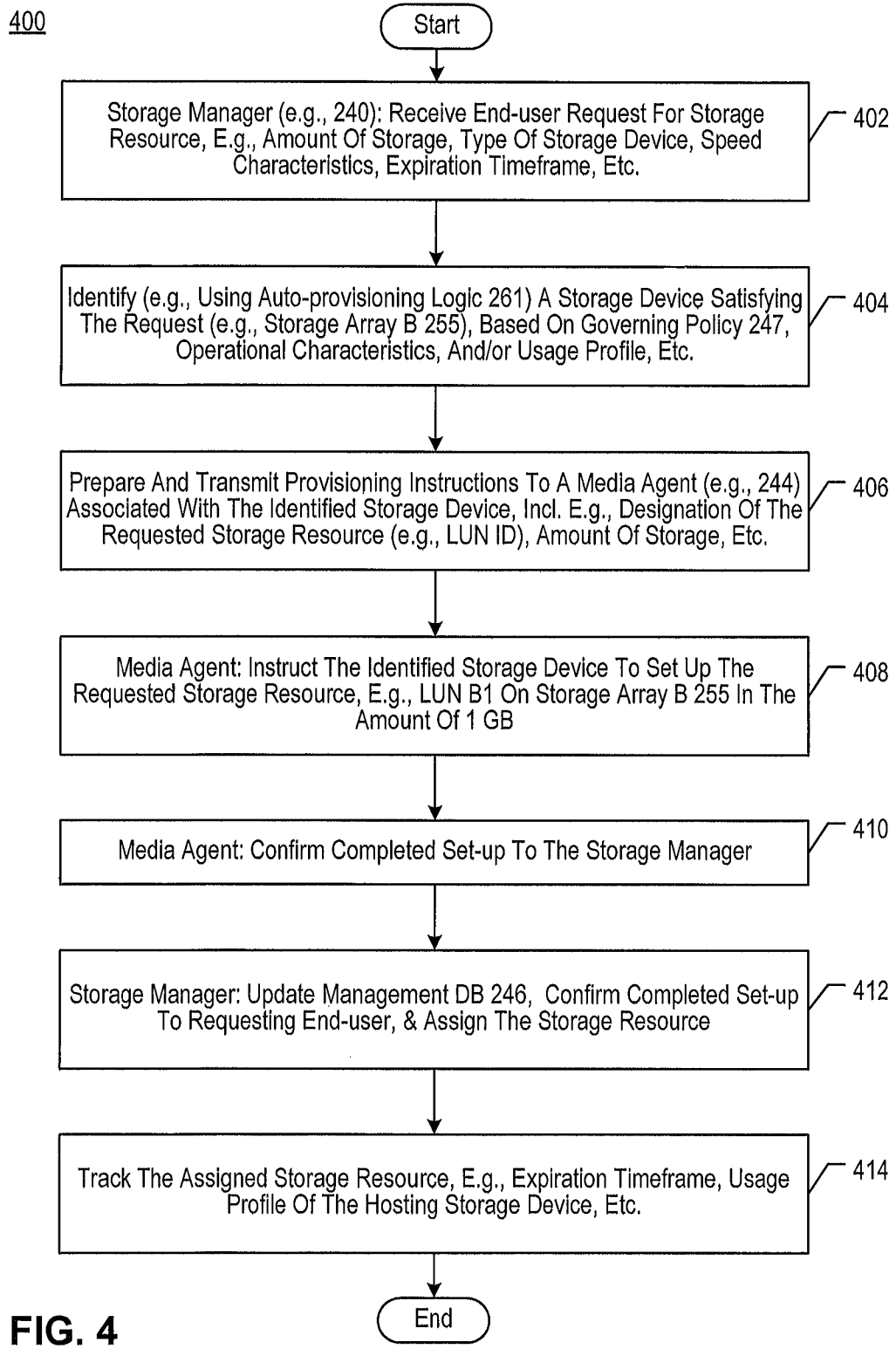
FIG. 4 depicts some salient operations of a method 400 operating in system 200 according to an illustrative embodiment of the present invention.

FIG. 4 depicts some salient operations of a method 400 operating in system 200 according to an illustrative embodiment of the present invention. Method 400 is generally directed at automated intelligent provisioning of storage space in system 200 in response to end-user requests for data storage space. The processing of end-user requests according to the illustrative embodiment advantageously streamlines the end-user experience and requires no further intervention from system administrators. Thus, after system 200 has been administered to include certain data storage devices and policies 247 (see, e.g., method 300), end-users may obtain storage space with minimal effort, having no need to investigate which data storage devices are available and requiring no further help from system administrators (see, e.g., method 500). Likewise, system administrators need not investigate availability and operational characteristics of installed data storage devices. Instead, system 200 processes end-user requests and automatically handles provisioning of suitable storage space and tracks the assigned storage space.

At block 402, storage manager 240 may receive (e.g., via end-user interface 231) an end-user request for storage resources. The request may be very simple and limited to an amount of storage space, e.g., 1 GB. The request may comprise additional parameters, such as type of storage technology (e.g., block-based, cloud, CIFS, NFS, etc.), storage interconnect protocol (e.g., FC, iSCSI, etc.), input/output ("I/O") speed, etc.), amount of cache, manufacturer, model, expiration timeframe, etc. The request may also comprise a desired designation defined by the end-user for referring to the storage space, e.g., "LUN4TESTINGonHOST1," "LUN5forCLUSTER1," etc.

At block 404, storage manager 240 (e.g., using auto-provisioning logic 261) may process the end-user's request to identify a storage device that can satisfy the request. The processing is based on governing policy 247, operational characteristics of the storage device, and tracking performed by storage manager 240. For example, a policy 247 that allows the requesting end-user access to storage devices 254-256 may also include a usage threshold of 60%. Illustratively, based on the measure of usage, storage manager 240 may choose data storage device 255 (storage array B) over data storage device 254 (storage array A). For example, storage manager 240 may choose data storage device 256 (storage array C) because it is the only storage device with sufficient available storage space to satisfy the request. Any number of resulting combinations and permutations are possible, depending on the specifics of the end-user's request, the policy 247 that controls which storage devices may be available to user, the operational characteristics of the allowed storage devices, and other situational data being tracked by storage manager 240, e.g., measures of usage.

At block 406, storage manager 240 (e.g., using auto-provisioning logic 261) may prepare and transmit provisioning instructions to media agent 244 associated with the identified storage device, including for example a designation of the requested storage resource (e.g., LUN ID), amount of requested storage space (e.g., 1 GB), etc.

At block 408, media agent 244 (e.g., using auto-provisioning logic 245) may process the instructions received from storage manager 240 and instruct the identified storage device to set up a storage resource, e.g., LUN B1 on storage array B 255 in the amount of 1 GB.

At block 410, media agent 244 (e.g., using auto-provisioning logic 245) may confirm the completed set-up to storage manager 240.

At block 412, storage manager 240 (e.g., using auto-provisioning logic 261) may update management database 246, and may confirm the completed set-up to the requesting end-user and assign the storage resource accordingly. For example, storage manager 240 may generate and store to management database 246 an association between the requesting end-user and/or client computing device 102 and the assigned storage space. Once the storage space has been set up at the storage device and confirmed to the requesting end-user, the space is said to be assigned or reserved in accordance with the request. At this point, the end-user may access the assigned storage space, as described in further detail in regard to method 500.

At block 414, storage manager 240 (e.g., using auto-provisioning logic 261) may track the assigned storage resource until the assignment expires. For example, storage manager 240 may track an expiration timeframe, which may be a system-wide default value, may be specified in policy 247, or may be requested by the end-user. Depending on the implementation, end-user-requested timeframes may prevail over timeframes specified in a governing policy 247. In some embodiments, the system default or policy 247 may prevail over the end-user-supplied expiration timeframe. Storage manager 240 may remind the requesting end-user of upcoming expiration for the assigned storage resource and may accept extensions of time supplied by the end-user (e.g., using end-user interface 231). Storage manager 240 also may track the usage of the hosting data storage device, e.g., storage array B 255, as described elsewhere.

Method 400 may end or control may pass back to block 402 for processing other end-user requests for storage resources. There is no limit to the number of end-user requests, number of assigned storage resources (e.g., LUN B1, LUN C1, etc.) and/or number of data storage devices that may be used for intelligent automatic provisioning in response to end-user requests according to the present disclosure.

Figure 5:
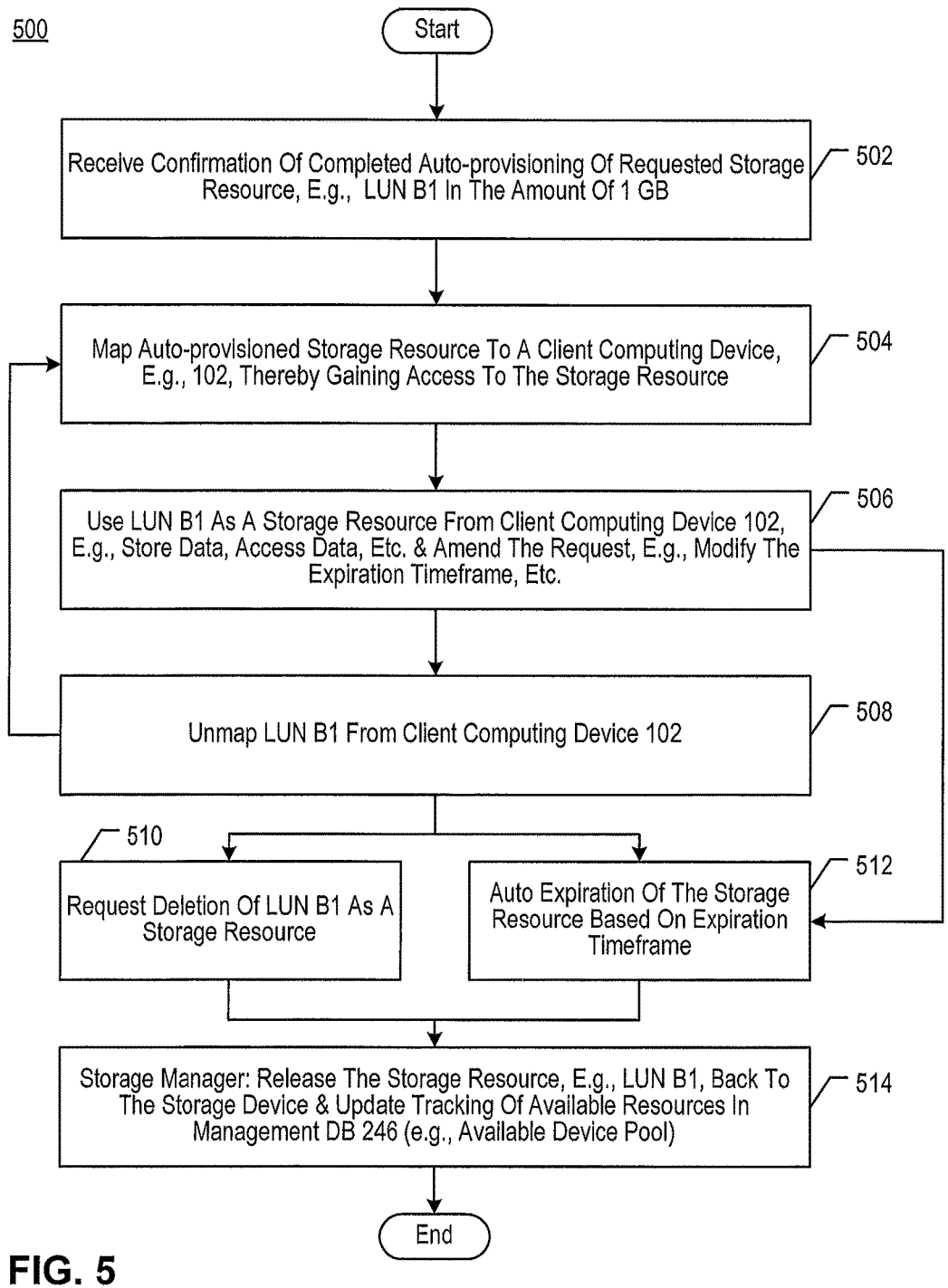
FIG. 5 depicts some salient operations of a method 500 operating in system 200 according to an illustrative embodiment of the present invention.

FIG. 5 depicts some salient operations of a method 500 operating in system 200 according to an illustrative embodiment of the present invention. Method 500 is generally directed at the end-user experience in system 200 and at handling of termination triggers for auto-provisioned storage space.

At block 502, an end-user who submitted a request for data storage resources (see, e.g., block 402) may receive confirmation (e.g., via end-user interface 231) of completed auto-provisioning of the requested storage space, e.g., LUN B1 in the amount of 1 GB of storage space. The confirmation may be issued by storage manager 240 (see, e.g., block 412), and may comprise an identifier for the assigned storage space, e.g., a designation requested by the end-user (see, e.g., block 402) or a designation automatically generated by storage manager 240, e.g., "AutoLUN1," etc. The confirmation may further comprise other operational characteristics of the assigned space, which may have been part of the end-user's request, e.g., type of storage technology, storage interconnect protocol, I/O speed, manufacturer, model, etc. without limitation. The confirmation may further comprise additional details about the assigned storage resource such as an identifier of the data storage device that hosts the assigned storage space (e.g., name, IP address, etc.); an applicable expiration timeframe (e.g., established by the requester or by the system); other operational characteristics about the hosting data storage device (e.g., from management database 246); etc. without limitation. In some embodiments, the confirmation appears to the end-user upon login to the web console (e.g., via end-user interface 231) as a "Ready" message such as "LUN4TESTINGonHOST1 is Ready."

At block 504, having received a confirmation that the storage space is assigned, the end-user may activate a "map" command to map the auto-provisioned storage resource to a client computing device 102, thereby gaining access to the storage resource. Mapping a storage resource such as a LUN to a client computing device for the purpose of gaining access to the storage resource is well known in the art and in some embodiments the actual command or series of commands may carry a different designation (e.g., using mount points in the UNIX world as compared to mapping a drive in the Microsoft Windows world). Any "map" or equivalent operation is supported by system 200.

At block 506, the client computing device 102 that maps the auto-provisioned storage resource, e.g., LUN B1, may use it to store and retrieve data, access data, delete data therein, etc. Moreover, the requesting end-user also may modify the expiration timeframe of the assigned auto-provisioned storage resource, e.g., via end-user interface 231. An expiration timeframe also may be modified by an administrator (e.g., using administrator user interface 262). Control may pass to block 512 if an expiration timeframe passes before reaching block 508.

At block 508, LUN B1 may be unmapped (or equivalent) from client computing device 102, thus severing the client computing device from the storage space in LUN B1. Although the storage space in LUN B1 is still assigned at this point and still comprises data, client computing device 102 no longer has access thereto, unless LUN B1 is re-mapped (or equivalent) as described at block 504. At block 504, LUN B1 may be mapped (or equivalent) to one or more other client computing devices 102—so long as the association is allowed by the governing policy 247.

At block 510, which may follow block 508, the end-user may request deletion of LUN B1 as a storage resource (e.g., using end-user interface 231). This affirmative request causes system 200 to unassign the storage space set aside in LUN B1 and to release the storage space for other uses. This request is processed at block 514.

At block 512, which may follow block 508, an expiration event may occur based on an expiration timeframe. The expiration event is processed at block 514.

At block 514, storage manager 240 may release the storage resource, e.g., LUN B1, back to the hosting storage device, e.g., storage array B. In a reversal of the operations of blocks 406-410, storage manager 240 and media agent 244 that is associated with the hosting data storage device may delete the storage space of LUN B1 and may reconfigure it as available space in the storage device. Furthermore, storage manager 240 may update its tracking of available resources in management database 246, e.g., a pool of available data storage devices. Block 514 has the effect of ending the assignment of the storage resource LUN B1 to the requesting end-user and/or client computing device 102 and restoring the storage space to a pool of available data storage devices that are to be made accessible in response to further requests for data storage space. The released/restored storage space may now be assigned to other requesting end-users and/or client computing devices 102 without limitation. Method 500 may end here or control may pass back to block 502 for processing operations for any number of other end-users of system 200, without limitation.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation.

Example Embodiments

According to an illustrative embodiment of the present invention, a method may comprise: receiving, by a storage manager component that manages a data storage management system, a user-submitted request for a first amount of data storage to be used as a data storage resource in the data storage management system; identifying, by the storage manager, a first data storage device in the data storage management system that satisfies the request; transmitting, by the storage manager, to a media agent that is associated with the first data storage device, one or more instructions to provision in the first data storage device the requested first amount of data storage, wherein the media agent is also a component of the data storage management system; receiving, by the storage manager, from the media agent, a confirmation that the first amount of data storage has been provisioned in the first data storage device; transmitting, by the storage manager, to the user, a confirmation that the first amount of data storage has been provisioned; and accessing, by a first client computing device associated with the user, the first amount of data storage provisioned in the first storage device.

The above-recited method wherein the request comprises an expiration timeframe for the first amount of data storage to be used as a data storage resource; and wherein the expiration timeframe determines how long the first amount of data storage provisioned in the first data storage device may be accessed by one of the user and the first client computing device. The above-recited method may further comprise: wherein the request comprises an operational characteristic required of a storage device that is to provide the first amount of data storage to be used as a data storage resource; and wherein the identifying of the first data storage device in the data storage management system that satisfies the request is based on consulting a database associated with the storage manager, wherein the database comprises one or more operational characteristics discovered by the storage manager in regard to one or more data storage devices installed in the data storage management system. The above-recited method wherein the identifying of the first data storage device in the data storage management system that satisfies the request is based on an information management policy that permits access by the user to the first data storage device. The above-recited method wherein the identifying of the first data storage device in the data storage management system that satisfies the request is based on an information management policy that permits access by the first client computing device to the first data storage device. The above-recited method wherein the identifying of the first data storage device in the data storage management system that satisfies the request is based on an information management policy, which is stored in a database associated with the storage manager, and which permits access to the first data storage device by one of: the user and the first client computing device.

The above-recited method wherein the identifying of the first data storage device in the data storage management system that satisfies the request is based on an information management policy, which is stored in a database associated with the storage manager, and which permits access to the first data storage device if the first data storage device satisfies a predefined threshold level of usage. The above-recited method wherein the identifying of the first data storage device in the data storage management system that satisfies the request is based on an information management policy, which is stored in a database associated with the storage manager, and which permits access to the first data storage device if the first data storage device satisfies a predefined threshold level of usage; and wherein the storage manager tracks usage levels of one or more data storage devices installed in the data storage management system, including the first data storage device. The above-recited method wherein the identifying of the first data storage device in the data storage management system that satisfies the request is based on an information management policy, which is stored in a database associated with the storage manager, and which comprises an expiration timeframe for access to the first data storage device; and wherein the expiration timeframe in the information management policy determines how long the first amount of data storage provisioned in the first data storage device may be accessed by one of: the user and the first client computing device. The above-recited method may further comprise: tracking, by the storage manager, the first data storage resource in reference to an expiration timeframe thereof established by one of: the user's request, and an information management policy that permits access to the first data storage device. The above-recited method may further comprise: tracking, by the storage manager, the first data storage device to determine a usage level for the first data storage device; wherein the usage level for the first data storage device determines whether the first data storage device is identified by the storage manager for another request for a second amount of data storage to be used as a data storage resource in the data storage management system. The above-recited method may further comprise: receiving, by the storage manager, a second request for a second amount of data storage to be used as a second data storage resource in the data storage management system; determining, by the storage manager, that the first data storage device exceeds a usage-level threshold specified in an information management policy that governs provisioning of data storage resources based on user requests; and based at least in part on the determining, identifying, by the storage manager, a second data storage device in the data storage management system that satisfies the second request and does not exceed the usage-level threshold specified in the information management policy. The above-recited method wherein the accessing comprises mapping the first amount of data storage provisioned in the first data storage device to the first client computing device. The above-recited method wherein the accessing comprises using on the first client computing device a mount point for the first amount of data storage provisioned in the first storage device.

According to another illustrative embodiment, a system for provisioning data storage resources based on user-submitted requests may comprise: a storage manager that executes on a computing device comprising one or more processors and non-volatile computer memory; a database, stored in non-volatile computer memory and associated with the storage manager, for storing information used by the storage manager for managing operations in the system; one or more data storage devices comprising non-volatile computer memory; a media agent that executes a computing device comprising one or more processors and non-volatile computer memory, wherein the media agent is associated with the one or more data storage devices; and wherein the storage manager is programmed to: initiate discovery operations to discover operational characteristics of the one or more storage devices, store the discovered operational characteristics of the one or more storage devices to the database, and store an information policy to the database, wherein the information management policy governs granting of access to the one or more data storage devices, by the storage manager, in response to requests for data storage resources submitted by users of the system.

The above-recited system wherein the information management policy comprises an association between one or more first client computing devices and the one or more data storage devices; and wherein the access granted in response to the requests for data storage requests for the one or more first client computing devices is limited to the one or more data storage devices in the information management policy. The above-recited system wherein the information management policy comprises an expiration timeframe for access granted to the one or more data storage devices in response to the user requests. The above-recited system may further comprise: a client computing device comprising one or more processors and non-volatile computer memory; and wherein the storage manager is further programmed to: receive a request from a user of the client computing device for a first amount of data storage space to be accessed as a data storage resource by the client computing device, based on the information management policy, identify a first one of the one or more data storage devices that satisfies the request, and instruct the media agent to provision the first amount of data storage space in the identified first data storage device, wherein the provisioned first amount of data storage space in the identified first data storage device becomes accessible as a data storage resource to the client computing device. The above-recited system may further comprise: a client computing device comprising one or more processors and non-volatile computer memory; and wherein the storage manager is further programmed to: receive a request from a user of the client computing device for a first amount of data storage space to be accessed as a data storage resource by the client computing device, based on the information management policy, identify a first one of the one or more data storage devices that satisfies the request, and instruct the media agent to provision the first amount of data storage space in the identified first data storage device, and grant to the client computing device access to the first amount of data storage provisioned in the identified first data storage device.

The above-recited system may further comprise: a client computing device comprising one or more processors and non-volatile computer memory; and wherein the storage manager is further programmed to: receive a request from a user of the client computing device for a first amount of data storage space to be accessed as a data storage resource by the client computing device, wherein the request also comprises an operational characteristic required of a data storage device providing the first amount of data storage space, identify a first data storage device that satisfies the request, based on the information management policy and the operational characteristic in the request, wherein the first data storage device is one of the one or more data storage devices, and instruct the media agent to provision the first amount of data storage space in the identified first data storage device, wherein the provisioned first amount of data storage space in the identified first data storage device becomes accessible as a data storage resource to the client computing device. The above-recited system may further comprise: a client computing device comprising one or more processors and non-volatile computer memory; and wherein the storage manager is further programmed to: receive a request from a user of the client computing device for a first amount of data storage space to be accessed as a data storage resource by the client computing device, wherein the request comprises an expiration timeframe that determines how long the first amount of data storage space is to be accessed by the client computing device, identify a first data storage device that satisfies the request based on the information management policy, wherein the first data storage device is one of the one or more data storage devices, and instruct the media agent to provision the first amount of data storage space in the identified first data storage device, wherein the provisioned first amount of data storage space in the identified first data storage device becomes accessible as a data storage resource to the client computing device, and after the expiration timeframe has expired, withdraw access to the by the client computing device to the data storage resource. The above-recited system may further comprise: a client computing device comprising one or more processors and non-volatile computer memory; and wherein the storage manager is further programmed to: receive a request from a user of the client computing device for a first amount of data storage space to be accessed as a data storage resource by the client computing device, identify a first data storage device that satisfies the request based on the information management policy, wherein the first data storage device is one of the one or more data storage devices, and instruct the media agent to provision the first amount of data storage space in the identified first data storage device, wherein the provisioned first amount of data storage space in the identified first data storage device becomes accessible as a data storage resource to the client computing device, and after an expiration timeframe specified by the information management policy has expired, withdraw from the client computing device access to the data storage resource.

The above-recited system may further comprise: a client computing device comprising one or more processors and non-volatile computer memory; and wherein the media agent is programmed to: in response to instructions received from the storage manager, provision the first amount of data storage space in an identified first data storage device, wherein the first data storage device is one of the one or more data storage devices, and wherein the provisioned first amount of data storage space in the identified first data storage device becomes accessible as a data storage resource to the client computing device. The above-recited system may further comprise; a client computing device comprising one or more processors and non-volatile computer memory, wherein the client computing device accesses a first assigned data storage space hosted by a first one of the one or more data storage devices; and wherein the storage manager is further programmed to: discover a usage profile of the first data storage device, wherein the usage profile comprises an association between the first assigned data storage space and the client computing device, and store to the database at least one of: the discovered usage profile and the association. The above-recited system may further comprise: a client computing device comprising one or more processors and non-volatile computer memory, wherein the client computing device accesses a first assigned data storage space hosted by a first one of the one or more data storage devices; and wherein the storage manager is further programmed to: discover a usage profile of the first data storage device, wherein the usage profile comprises an association between the first assigned data storage space and the client computing device, and based on the discovered usage profile, amend the information management policy to govern access to the first assigned data storage space by the client computing device. The above-recited system may further comprise; a client computing device comprising one or more processors and non-volatile computer memory, wherein the client computing device accesses a first assigned data storage space hosted by a first one of the one or more data storage devices; and wherein the storage manager is further programmed to: discover an association between the first assigned data storage space and the client computing device, and apply the information management policy to the first assigned data storage space, wherein, based on the applied information management policy, an expiration timeframe in the information management policy governs how long the client computing device may access the assigned first data storage space.

According to yet another example embodiment of the present invention, at least one computer-readable medium, excluding transitory propagating signals, may store instructions that, when executed by at least one computing device comprising one or more processors and non-volatile computer memory, will cause the at least one computing device to perform operations comprising: in response to a first request for a first amount of data storage space to be used as a storage resource, granting a client computing device access to the first amount of data storage space as provisioned on a first data storage device; in response to a termination trigger for the storage resource, withdrawing from the client computing device access to the first amount of data storage space provisioned on the first data storage device; and restoring the first amount of data storage space to a pool of available data storage devices that are to be made accessible in response to further requests for data storage space.

The above-recited at least one computer-readable medium wherein the granting of access to the first amount of data storage space is based on an information management policy that governs the pool of available data storage devices that can be made accessible to the client computing device. The above-recited at least one computer-readable medium wherein the first request comprises an operational characteristic that is required of a data storage device that is to host the requested first amount of data storage space; and wherein the granting of access to the first amount of data storage space is based on matching the requested operational characteristic with a data storage device in the pool of available data storage devices. The above-recited at least one computer-readable medium wherein the operations further comprise: prior to the granting of access, discovering one or more operational characteristics of each data storage device in the pool of available data storage devices.

The above-recited at least one computer-readable medium wherein the requested operational characteristic is a type of storage array, wherein the type is defined by the identity of the storage array's manufacturer. The above-recited at least one computer-readable medium wherein the requested operational characteristic is an input-output speed of the data storage device. The above-recited at least one computer-readable medium wherein the requested operational characteristic is a type of storage technology of the data storage device. The above-recited at least one computer-readable medium wherein the requested operational characteristic is a storage capacity of the data storage device. The above-recited at least one computer-readable medium wherein the requested operational characteristic is a storage interconnect protocol used by the data storage device. The above-recited at least one computer-readable medium wherein the requested operational characteristic is a number of provisionable storage entities in the data storage device.

In other embodiments of the present invention, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.
Terminology Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A data storage management system including features for provisioning data storage resources based on user-submitted requests, the system comprising:
   a storage manager that executes on a computing device comprising one or more processors and non-transitory computer memory, wherein the storage manager manages storage management operations in the data storage management system;
   a database, stored in non-transitory computer memory and associated with the storage manager, for storing information used by the storage manager for managing the storage management operations in the data storage management system;
   a media agent that executes on a computing device comprising one or more processors and non-transitory computer memory,
      wherein the media agent is associated with one or more data storage devices, and
      wherein the media agent tracks storage space allocated at the one or more data storage devices;
   wherein the storage manager is programmed to:
      initiate discovery operations, using the media agent, to discover operational characteristics of the one or more data storage devices,
      import from the media agent and store to the database the discovered operational characteristics of, and the storage space allocated at, the one or more data storage devices,
      generate an information management policy that governs provisioning more storage space at, and granting of access to, the one or more data storage devices in response to requests for data storage resources submitted by users of the data storage management system,
      receive a request from a user for a first amount of data storage space to be accessed as a data storage resource by a client computing device,
         wherein the request also comprises an operational characteristic required of a data storage device providing the first amount of data storage space,
      identify a first data storage device that satisfies the request,
         based on the information management policy and the operational characteristic in the request, and also based on operational characteristics of and storage space allocated at the first data storage device,
         wherein the first data storage device is one of the one or more data storage devices, and
      instruct the media agent to provision the first amount of data storage space in the identified first data storage device,
         wherein the provisioned first amount of data storage space in the first data storage device becomes accessible as a data storage resource to the client computing device;
   wherein the media agent is programmed to provision the first amount of data storage space at the first data storage device as instructed by the storage manager; and
   wherein the storage manager is further programmed to: manage storage management operations for the provisioned first amount of data storage space in the first data storage device.

2. The data storage management system of claim 1, wherein the information management policy comprises an expiration timeframe for access to the first data storage device; and
   wherein the expiration timeframe in the information management policy determines how long the first amount of data storage provisioned in the first data storage device may be accessed by one of: a user of the data storage management system and a first client computing device.

3. The data storage management system of claim 1, wherein the storage manager is further programmed to:
   track the first data storage device to determine a usage level for the first data storage device;
   wherein the usage level for the first data storage device determines whether the first data storage device is identified by the storage manager for another request for a second amount of data storage to be used as a data storage resource in the data storage management system.

4. The data storage management system of claim 1, wherein the storage manager is further programmed to:
   receive a second request for a second amount of data storage to be used as a second data storage resource in the data storage management system;
   determine that the first data storage device exceeds a usage-level threshold specified in the information management policy; and
   identify a second data storage device in the data storage management system that satisfies the second request and does not exceed the usage-level threshold specified in the information management policy.

5. The data storage management system of claim 1, wherein the information management policy comprises an association between one or more first client computing devices and the one or more data storage devices; and
   wherein access granted in response to the requests for data storage resources for the one or more first client computing devices is limited to the one or more data storage devices based on the information management policy.

6. The data storage management system of claim 1,
wherein the request comprises an expiration timeframe that determines how long the first amount of data storage space is to be accessed by the client computing device, and
wherein the storage manager is further programmed to: after the expiration timeframe has expired, withdraw access by the client computing device to the data storage resource.

7. A data storage management system including features for provisioning data storage resources based on user-submitted requests, the system comprising:
a storage manager that executes on a computing device comprising one or more processors and non-transitory computer memory, wherein the storage manager manages storage management operations in the data storage management system;
a database, stored in non-transitory computer memory and associated with the storage manager, for storing information used by the storage manager for managing the storage management operations in the data storage management system;
a media agent that executes on a computing device comprising one or more processors and non-transitory computer memory,
wherein the media agent is associated with one or more data storage devices, and
wherein the media agent tracks storage space allocated at the one or more data storage devices;
wherein the storage manager is programmed to:
initiate discovery operations, using the media agent, to discover operational characteristics of the one or more data storage devices,
import from the media agent and store to the database the discovered operational characteristics of, and the allocated storage space at, the one or more data storage devices, and
generate an information management policy that governs provisioning more storage space at, and granting of access to, the one or more data storage devices in response to requests for data storage resources submitted by client computing devices in the data storage management system,
based on the information management policy, instruct the media agent to implement the provisioning of more storage space, which depends at least in part on the operational characteristics of, and allocated storage space at, the one or more data storage devices associated with the media agent, and
manage storage management operations for the provisioned more storage space at the one or more data storage devices;
wherein the media agent is programmed to implement the provisioning as instructed by the storage manager based on the information management policy;
a client computing device comprising one or more processors and non-transitory computer memory,
wherein the client computing device accesses a first data storage space provisioned by the media agent and hosted by a first data storage device of the one or more data storage devices; and
wherein the storage manager is further programmed to:
discover a usage profile of the first data storage device, wherein the usage profile comprises an association between the first data storage space and the client computing device, and
store to the database at least one of: the discovered usage profile and the association.

8. The data storage management system of claim 7 further comprising:
based on the discovered usage profile, amend the information management policy to govern access to the first data storage space by the client computing device.

9. The data storage management system of claim 7, wherein the storage manager is further programmed to: maintain a logical pool of data storage resources at the one or more data storage devices that are available for the provisioning of more storage space.

10. The data storage management system of claim 7, wherein the storage management operations comprise at least one of: (i) data movement operations, (ii) processing and data manipulation operations, and (iii) analysis, reporting, and management operations.

11. A non-transitory computer-readable medium storing instructions that, when executed by a computing device comprising one or more processors and computer-readable memory, cause the computing device to:
initiate discovery operations, using a media agent, to discover operational characteristics of one or more data storage devices and allocated data storage space at the one or more data storage devices, which are associated with the media agent;
import from the media agent and store to a database the discovered operational characteristics of, and the allocated data storage space at, the one or more data storage devices;
generate an information management policy that governs provisioning more storage space at, and granting of access to, the one or more data storage devices in response to requests for data storage resources submitted by users of a data storage management system, which is managed by the computing device;
receive a request from a user for a first amount of data storage space to be accessed as a data storage resource by a client computing device,
wherein the request also comprises an operational characteristic required of a data storage device providing the first amount of data storage space;
identify a first data storage device that satisfies the request,
based on the information management policy and the operational characteristic in the request and also based on operational characteristics of and storage space allocated at the first data storage device,
wherein the first data storage device is one of the one or more data storage devices;
instruct the media agent to provision the first amount of data storage space in the identified first data storage device,
wherein the provisioned first amount of data storage space in the identified first data storage device becomes accessible as a data storage resource to the client computing device; and
manage storage management operations for the first amount of data storage space in the first data storage device, wherein the storage management operations comprise at least one of: (i) data movement operations, (ii) processing and data manipulation operations, and (iii) analysis, reporting, and management operations.

12. The non-transitory computer-readable medium of claim 11, wherein the information management policy comprises an expiration timeframe for access to the first data storage device; and wherein the expiration timeframe in the information management policy determines how long the first amount of data storage provisioned in the first data storage device may be accessed by one of: a user of the data storage management system and a first client computing device.

13. The non-transitory computer-readable medium of claim 11, wherein the instructions further cause the computing device to:
- track the first data storage device to determine a usage level for the first data storage device;
- wherein the usage level for the first data storage device determines whether the first data storage device is identified by the storage manager for another request for a second amount of data storage to be used as a data storage resource in the data storage management system.

14. The non-transitory computer-readable medium of claim 11, wherein the instructions further cause the computing device to:
- receive a second request for a second amount of data storage to be used as a second data storage resource in the data storage management system;
- determine that the first data storage device exceeds a usage-level threshold specified in the information management policy; and
- identify a second data storage device in the data storage management system that satisfies the second request and does not exceed the usage-level threshold specified in the information management policy.

15. The non-transitory computer-readable medium of claim 11, wherein the information management policy comprises an association between one or more first client computing devices and the one or more data storage devices; and
- wherein access granted in response to the requests for data storage resources for the one or more first client computing devices is limited to the one or more data storage devices based on the information management policy.

16. The non-transitory computer-readable medium of claim 11,
- wherein the request comprises an expiration timeframe that determines how long the first amount of data storage space is to be accessed by the client computing device,
- wherein after the expiration timeframe has expired, the instructions further cause the computing device to: withdraw access by the client computing device to the data storage resource.

* * * * *